United States Patent
Kato

(10) Patent No.: US 9,984,307 B2
(45) Date of Patent: May 29, 2018

(54) COLORING INSPECTION APPARATUS AND COLORING INSPECTION METHOD

(71) Applicant: PAPALAB CO., LTD., Hamamatsu-shi, Shizuoka (JP)

(72) Inventor: Makoto Kato, Hamamatsu (JP)

(73) Assignee: PAPALAB CO, LTD., Hamamatsu-shi, Shizuoka (JP)

( * ) Notice: Subject to any disclaimer, the term of this patent is extended or adjusted under 35 U.S.C. 154(b) by 192 days.

(21) Appl. No.: 14/900,170

(22) PCT Filed: Jan. 14, 2015

(86) PCT No.: PCT/JP2015/000141
§ 371 (c)(1),
(2) Date: Dec. 20, 2015

(87) PCT Pub. No.: WO2015/107889
PCT Pub. Date: Jul. 23, 2015

(65) Prior Publication Data
US 2016/0140734 A1 May 19, 2016

(30) Foreign Application Priority Data

Jan. 14, 2014 (JP) ................................. 2014-004680

(51) Int. Cl.
*G06K 9/46* (2006.01)
*G01J 3/46* (2006.01)
(Continued)

(52) U.S. Cl.
CPC .......... *G06K 9/4642* (2013.01); *G01J 3/0202* (2013.01); *G01J 3/462* (2013.01);
(Continued)

(58) Field of Classification Search
None
See application file for complete search history.

(56) References Cited

U.S. PATENT DOCUMENTS

| 6,181,820 B1 * | 1/2001 | Tachikawa | G06K 9/00463 382/190 |
| 2003/0020743 A1 * | 1/2003 | Barbieri | G06F 17/30802 715/719 |

(Continued)

FOREIGN PATENT DOCUMENTS

| JP | 7-71939 A | 3/1995 |
| JP | 8-115021 A | 5/1996 |

(Continued)

OTHER PUBLICATIONS

F. Porikli, "Integral histogram: a fast way to extract histograms in Cartesian spaces," 2005 IEEE Computer Society Conference on Computer Vision and Pattern Recognition (CVPR'05), 2005, pp. 829-836 vol. 1. doi: 10.1109/CVPR.2005.188.*

(Continued)

*Primary Examiner* — Edward Park
*Assistant Examiner* — Nathan Bloom
(74) *Attorney, Agent, or Firm* — Matthias Scholl, PC; Matthias Scholl

(57) ABSTRACT

An object is to ensure clear and easy quantification of the textures such as metallic texture and shiny texture of pearl pigment and to rationalize comparison inspection between an inspection object and a reference object. A coloring inspection apparatus 1 includes a camera 2 that is configured to have three spectral sensitivities ($S1(\lambda)$, $S2(\lambda)$, $S3(\lambda)$) linearly and equivalently converted to a CIE XYZ color matching function, an arithmetic processing unit 3 that is configured to obtain and compute coloring data by conversion of an image which has three spectral sensitivities and is obtained by the camera 2 into tristimulus values X, Y and Z in a CIE XYZ color system, and lighting units 6 that are configured to illuminate an automobile 5 as an example of measuring object. The coloring inspection apparatus 1 computes a color distribution consistency index that represents a (Continued)

ratio of overlap of two xyz chromaticity histogram distributions of an inspection object Q and a reference object R, so as to inspect color.

5 Claims, 24 Drawing Sheets

(51) Int. Cl.
| | |
|---|---|
| *G06K 9/62* | (2006.01) |
| *G06T 7/90* | (2017.01) |
| *G06T 7/00* | (2017.01) |
| *H04N 5/232* | (2006.01) |
| *H04N 5/225* | (2006.01) |
| *G01J 3/50* | (2006.01) |
| *G01J 3/02* | (2006.01) |
| *G01J 3/28* | (2006.01) |

(52) U.S. Cl.
CPC ............... *G01J 3/465* (2013.01); *G01J 3/50* (2013.01); *G01J 3/504* (2013.01); *G06K 9/4652* (2013.01); *G06K 9/6201* (2013.01); *G06K 9/6212* (2013.01); *G06T 7/001* (2013.01); *G06T 7/90* (2017.01); *H04N 5/2251* (2013.01); *H04N 5/2256* (2013.01); *H04N 5/23229* (2013.01); *G01J 2003/2813* (2013.01); *G06T 2207/10024* (2013.01)

(56) References Cited

U.S. PATENT DOCUMENTS

| | | | | |
|---|---|---|---|---|
| 2003/0142222 A1* | 7/2003 | Hordley | ............... | G06K 9/4652 348/223.1 |
| 2006/0159370 A1* | 7/2006 | Tanaka | ................. | G06K 9/4652 382/305 |
| 2006/0177131 A1* | 8/2006 | Porikli | ................... | G06F 17/18 382/168 |
| 2012/0288197 A1* | 11/2012 | Adachi | ................... | G06T 7/001 382/167 |
| 2013/0322750 A1* | 12/2013 | Agarwal | .............. | G06K 9/4652 382/165 |

FOREIGN PATENT DOCUMENTS

| | | |
|---|---|---|
| JP | 9-203664 A | 8/1997 |
| JP | 9-231362 A | 9/1997 |
| JP | 2005-238817 A | 9/2005 |
| JP | 2005-257827 A | 9/2005 |
| JP | 2010-145097 A | 7/2010 |
| JP | 2010-263439 A | 11/2010 |
| JP | 2011-146860 A | 7/2011 |
| JP | 2013-125322 A | 6/2013 |
| JP | 2014-187558 A | 10/2014 |
| WO | 2005086495 A1 | 9/2005 |

OTHER PUBLICATIONS

Nejhum, SM Shahed, Jeffrey Ho, and Ming-Hsuan Yang. "Visual tracking with histograms and articulating blocks." Computer Vision and Pattern Recognition, 2008. CVPR 2008. IEEE Conference on. IEEE, 2008.*
López, Fernando, et al. "Fast surface grading using color statistics in the CIE Lab space." Iberian Conference on Pattern Recognition and Image Analysis. Springer, Berlin, Heidelberg, 2005.*
M. Matsuda, Measurement of paint appearance for automobile, Technical Journal R&D, Jun. 1994, vol. 29, No. 2, Technology Public Relations Sec., Japan.
S. Masaari, Car "paint" Change and future of pigment used in automotive paints, JAMAGAZINE, 2007, vol. 4, Japan, [online], <URL: http://www.jama.or.jp/lib/jamagazine/200704/index.html >.
T. Ohmura, et al, Development of "Cosmo Silver" for SOARER, May 2003, pp. 20-28, vol. 140, Toyota, Japan, [online], <URL: http://www.kansai.co.jp/rd/token/140.html >.

* cited by examiner

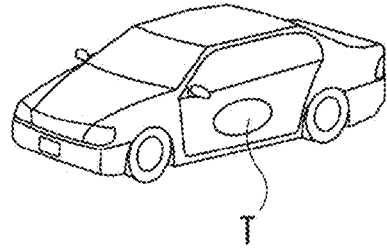
FIG. 20A
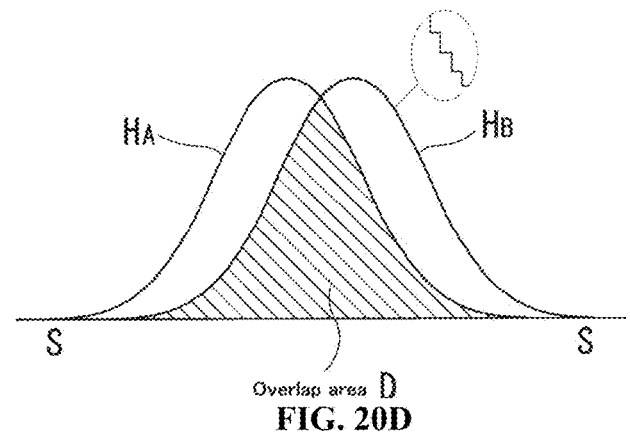
FIG. 20D
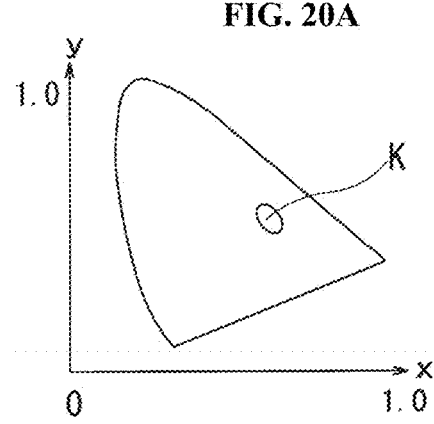
FIG. 20B
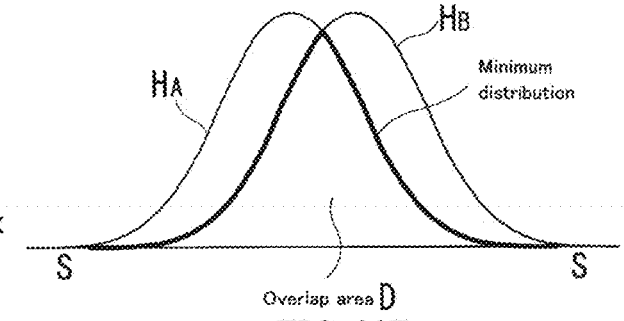
FIG. 20E
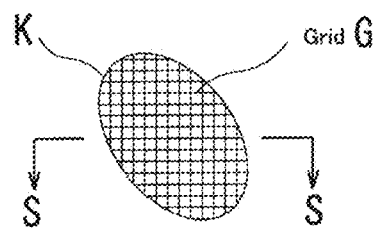
FIG. 20C
FIG. 20F Integrating color information in measurement range
Distribution diagram on xy chromaticity diagram of color 1 to 3

Three-dimensional diagram of integrated data of color
( Z axis corresponds to counting value )

COLORING INSPECTION APPARATUS AND COLORING INSPECTION METHOD

TECHNICAL FIELD

The present invention relates to a coloring inspection apparatus and a corresponding method of inspecting the color distribution of an image for evaluation of coating of a commercial product.

BACKGROUND ART

Various commercial products, for example, electric appliances, vehicles such as automobiles, housing and building products, electric appliances, and clothes, need coating or coloring. Such commercial products are coated and colored in the manufacturing process. The appearance color is an important factor for selection of a commercial product in the sales process.

For example, with regard to automobiles, the proposed techniques of Non-Patent Literatures 1 to 5 are not yet sufficient as the countermeasure for flip flop or the like. Release of every new model car continues to increase the number of outer panel colors. The user needs for the color become diversified. New colors are often set in the case of facelift or for specially equipped cars. Automobile manufactures in Japan present several ten new colors a year. The variation of color is expanded unlimitedly and causes a difficulty in color inspection.

An RGB color system camera is conventional means of obtaining coloring information. The RGB color system has been proposed by International Commission on Illumination (CIE) to provide color matching with regard to a desired color by additive mixing of three primary colors of specific wavelengths obtained from an actual optical spectrum. An RGB color matching function is employed to indicate a spectral sensitivity corresponding to the human eye in the RGB color system. This RGB color matching function may take negative values. Additive color mixing, however, does not allow for subtraction of lights. It is accordingly difficult to handle the negative value of spectral sensitivity. The RGB color system camera deforms and modifies the negative value of the RGB color matching function for approximation. Such approximation, however, does not enable the color in the color gamut of the human eye to be accurately detected and may cause color drift or color collapse of the image or the video image. A CIE XYZ color matching function (hereinafter referred to as XYZ color matching function) has been proposed, on the other hand, as a color space by coordinate transform from the RGB color matching function, in order to eliminate the negative values of the RGB color matching function. A spectral color measurement method and a tristimulus value direct reading method are provided as means for obtaining color information using the XYZ color matching function.

The spectral color measurement method directly measures an emission spectrum emitted from a light source with multiple sensors or measures the reflectance at each wavelength in a reflectance spectrum of a sample and uses the XYZ color matching function to calculate the sensitivity, so as to obtain tristimulus values X, Y and Z with high measurement accuracy. The tristimulus value direct reading method, on the other hand, uses an optical sensor with three different filters (color sensor or photoelectric colorimeter) to directly read tristimulus values X, Y and Z as colorimetric values.

Despite these means for obtaining color information, there is still a need for means of obtaining and analyzing color information. Patent Literature 1 provides the prior art relating to this means. More specifically Patent Literature 1 aims to provide a color unevenness inspection method that easily performs color unevenness inspection and an inspection image data generation apparatus used in the color unevenness inspection method. The color unevenness inspection method includes an inspection image display process of displaying a color unevenness inspection image by a projector 2, a color space conversion characteristic obtaining process of obtaining an RGB/XYZ conversion characteristic of the projector 2, an imaging process of imaging the color unevenness inspection image with an imaging unit to obtain image data, a color space conversion process of generating converted image data by converting a second color space system of the image data into a first color space system of the projector based on the RGB/XYZ conversion characteristic of the projector 2, a converted image display process of displaying the converted image data by the projector 2, and a color unevenness inspection process of inspecting the converted image for color unevenness. Patent Literature 2 discloses determining the quality of a sample based on the ratio of overlap between original image data and masked inspection image data.

Measurement of the coating appearance of automobile shown in Non-Patent Literature 1 has been proposed for evaluation of coloring. The coating appearance includes textures such as color, glossiness, smoothness (orange peel-like skin), metallic texture and rich deep sense and defects such as roughness, convexity, concavity, dripping and shedding. Defect inspection and texture measurement have been proposed. The texture measurement is performed for the scratch, color, metallic texture, sense of build and rich deep sense. The change in color trend of automobiles and the growing interest in perceived quality are behind such measurement.

The recent trend of finish coating for automobiles is increasing the dark colors such as red and blue, instead of the light colors such as white. It is empirically known that dark colors make dirt and damage on the coating surface easily noticeable. There is accordingly a need to measure the scratch and develop a scratch-resistant paint.

The solid coating and the metallic coating have different optical properties, so that different methods of colorimetry and different measuring machines should be used for colorimetry of the solid coating and the metallic coating.

In the solid coating, the in-layer diffusely reflected light distribution of color information is isotropic. A general colorimeter is thus usable for measurement of the solid coating. The colorimeter includes a spectral colorimeter and a colorimetric color difference meter. The spectral colorimeter measures a spectral reflectance $\rho(\lambda)$ of an object and computes tristimulus values X, Y and Z from a spectral distribution $P(\lambda)$ of illumination light and spectral tristimulus values $x(\lambda)$, $y(\lambda)$ and $z(\lambda)$ according to Expression (2).

The colorimetric color difference meter, on the other hand, directly measures tristimulus values X, Y and Z. Its principle is similar to the process that the human looks at an object (sample) and perceives color. An integrating sphere corresponding to the eyeball serves to collect the diffusely reflected light from the sample and lead the collected light to an optical receiver. Three types of photoreceptor cells that are placed in the retina and have sensitivity characteristics of spectral tristimulus values $x(\lambda)$, $y(\lambda)$ and $z(\lambda)$ are replaced by the optical receiver as the combination of a color filter and a photo diode. The quantities of stimulus transmitted through the optic nerve to the cerebrum are proportional to the output of the optical receiver and are shown as X, Y and Z values by an amplifier.

The colorimetric color difference meter has the colorimetric principle similar to the human eye as described above and is small-size and compact to be suitable for the use in the field. It should, however, be noted that some coating causes metamerism by the light source. Two types of coatings appear in the same color under the natural sunlight but appear in different colors under illumination of incandescent lamp. Such phenomenon that provides color matching under a specific light source but does not provide color matching under a different light source is called metamerism by the light source. The metamerism is attributable to the difference in type of pigment or more specifically the difference in spectral reflectance between two types of coatings. Accordingly, the spectral colorimeter should be used for measurement of the color of such coating.

The metallic coating includes a glittering material in its base layer, so that its in-layer diffusely reflected light distribution shows anisotropy. This accordingly provides the phenomenon that the color looks different at different angles of incidence and different light-receiving angles, i.e., geometric metamerism. A goniospectrophotometer that is configured to change the angle of incidence and the light-receiving angle is used for colorimetry of the metallic coat. A recently proposed technique measures a spectral reflectance $\rho(\lambda)$ under angular conditions and determines tristimulus values X, Y and Z.

In measurement of the metallic texture, the metallic texture denotes the sense by glittering of aluminum flakes in the coat and is also called shiny texture, sparkling texture or brightness. A proposed method scans the coat with a microscopic glossmeter and analyzes a reflective light intensity curve. But this method has not been widely used. A laser metallic texture measuring device (ALCOPE) has been developed recently and is becoming widely used.

CITATION LIST

Patent Literature

Patent Literature 1: JP 2010-145097A; and
Patent Literature 2: JP 2005-238817A

Non-Patent Literature

Non-Patent Literature 1: "Jidosha no Toso Gaikan Keisoku (Measurement of Coating Appearance of Automobile)", R&D Reviews of TOYOTA CENTRAL R&D LABS., INC., Vol. 29, No. 2 (1994. 6);
Non-Patent Literature 2: JA MAGAZINE, April, 2007, "Kuruma no 'Toryo' Jidosha yo Toryo ni Mochiiru Ganryo no Henka to Kongo ('Paints' for automobiles, change and future of pigments used for coating of automobiles)", Masatsugu Arimoto;
Non-Patent Literature 3: "Color Coordination no Jissai Shohin Shikisai (Present State of Color Coordination, Coloring of Commercial Products)" published by Tokyo Chamber of Commerce and Industry;
Non-Patent Literature 4: Techno-cosmos Vol. 15 "Color Design to Toshoku Sekkei (Color Design and Coating Color Design)" published by Nippon Paint Co., Ltd.; and
Non-Patent Literature 5: "Toryo no Kenkyu (Research of Paints)" Vol. 140, "Toyota Soarer muke 'Cosmo-silver no Kaihatu' (Development of Cosmo-silver for Toyota Soarer)" published by Kansai Paint Co., Ltd.

SUMMARY OF INVENTION

Technical Problem

The invention of Patent Literature 1, the invention of Patent Literature 2, the invention of Non-Patent Literature 1 and the descriptions of Non-Patent Literatures 2 to 5 allow for objective evaluation of color independent of the examiner's visual check. The accuracy and the technique for obtaining color information or more specifically the accuracy and the technique of the camera as imaging means are, however, not changed from the prior art. There is accordingly still a problem regarding the lately desired accuracy and technique of coloring evaluation.

The color of, for example, metallic texture is conventionally judged by the human eye. There is, however a difficulty in such color judgment, and a solution is sought. Especially, the flip flop of coloring of, for example, a vehicle causes a difficulty in accurate evaluation. There is accordingly a demand for analysis and evaluation of accurate color distribution.

With the recent development of metallic painting, various materials other than aluminum, for example, mica, may be mixed in the paint. The color of such painting may, however, be changed from the manufacturer's intention. The color of painting may be varied according to the climate conditions such as temperature and humidity, the quality of base coating, the operations of an air gun used for scanning and coating, and other various manufacturing conditions. This may result in an unexpected problem. The phenomenon called flip flop changes the shade and brightness of the appearance color of a vehicle according to the angle of view, due to the difference in material of the base coat. Such phenomenon may be observed in combination of different materials in the same location, for example, the door and the fender or the hood and the fender.

There are various methods of quality control with regard to the color. Even now, in many fields, skilled examiners perform visual inspection using criteria samples. This causes several problems in the industries that require the strict quality control. The first problem is the lack of objectivity. When the purpose of color management is to check how the object looks like, the visual inspection using the human eye has some accuracy. When the purpose of color management is to guarantee the client the quality of the object, however, the result of visual inspection is far from the objective data. The second problem is the lack of reproducibility of color. With an increasing trend for the traceability, the data resulting from the visual inspection is only the sensory acceptance/rejection of the examiner and is far from sufficient. It is important to allow the daily accumulated results of inspection to be taken out in an easily understandable form any time. The third problem is the lack of human resources. Providing criteria samples allows the visual inspection to be performed with a certain accuracy at a certain speed. Training and employing the examiners take both time and money. The examiner is a human and naturally has unsteadiness. The accuracy of inspection may depend on the conditions of the examiner. The examiners may leave the job due to various reasons. The examiners also have individual differences and naturally have human errors. The visual inspection needs the labor cost and has the lack of quality stability. This may cause the loss by product defects and may also cause the waste of transportation cost and time by transporting products between the plant and the user.

The color management by the conventional spectral colorimeter has the following disadvantages. 1. The imaging range is narrow (for example, circle of about 5 mm in diameter). In colorimetry, the pattern (texture or metallic texture) is averaged to be not obvious in the course of measurement of the average X, Y and Z values in the imaging range. The color is not accurately imaged, so that the color and the texture of the image are slightly different from the physical appearance. 2. It is difficult to actually call up an image of the color from only numerical data. 3. The image of a color sample as the standard taken with a conventional camera is slightly different from the physical appearance. 4. The color sample itself is discolored with time. 5. Different individual have different sensitivities to colors.

The conventional camera is only capable of detecting color data in the triangular RGB color gamut and accordingly has low color accuracy for display. The color data of a displayed image is shown in the sRGB color gamut, so that accurate color information is lost. The colors of an image taken with the conventional camera look differently from the actual colors. This is because the colors are displayed in the sRGB color gamut. The pigment containing lame or pearl component has total reflection and accordingly has difficulty in colorimetry. The prior art spectral colorimeter has a very narrow range of color measurement and may cause a significant variation in result of measurement according to the measuring location.

Additionally, the color looks different according to the luminosity of illumination. The prior arts have not taken into account this factor.

An object of the invention is thus to provide a coloring inspection apparatus and a coloring inspection method that respond to requests for acquisition, reproduction and analysis of faithful color information in the coloring field, obtain an accurate image color distribution faithful to human eye and accurately and readily inspect the texture such as the lame or pearl texture or the metallic texture and the fine color tint such as concavities and convexities of a product, the human body or the like.

Solution to Problem

In view of the above problems, the invention provides a coloring inspection apparatus, comprising a camera that is configured to have three spectral sensitivities (S1(λ), S2(λ), S3(λ)) linearly and equivalently converted to a CIE XYZ color matching function, an arithmetic processing unit that is configured to obtain and compute coloring data by conversion of an image which has three spectral sensitivities and is obtained by the camera into tristimulus values X, Y and Z in a CIE XYZ color system and a lighting unit that is configured to illuminate a measuring object. The arithmetic processing unit is configured to set a specified inspection area in the coloring data obtained by imaging the measuring object, compute x, y and z values of the inspection area normalized from X, Y and Z values of each pixel in the inspection area with regard to an inspection object and a reference object as the measuring objects, divide the inspection area by grids in xyz coordinates of an xyz chromaticity diagram and integrate numbers of pixels included in each grid with regard to the inspection object and the reference object to create respective xyz chromaticity histogram distributions and compute a color distribution consistency index that represents a ratio of overlap of the two xyz chromaticity histogram distributions of the inspection object and the reference object so as to inspect color.

In the case of obtaining XYZ chromaticity histogram distribution data, since x+y+z=1, computation of the z value may be omitted. Computing all the XYZ values in three-dimensional grids instead of two-dimensional grids increases the computation time. The ratio of overlap of the two xyz chromaticity histogram distributions may be a two-dimensional overlap index or a three-dimensional overlap index.

According to another aspect of the invention, there is provided a coloring inspection apparatus, comprising a camera that is configured to have three spectral sensitivities (S1(λ), S2(λ), S3(λ)) linearly and equivalently converted to a CIE XYZ color matching function, an arithmetic processing unit that is configured to obtain and compute coloring data by conversion of an image which has three spectral sensitivities and is obtained by the camera into tristimulus values X, Y and Z in a CIE XYZ color system, and a lighting unit that is configured to illuminate a measuring object. The arithmetic processing unit is configured to set a specified inspection area in the coloring data obtained by imaging the measuring object, convert X, Y and Z values of each pixel included in the inspection area into Lab values with regard to an inspection object and a reference object as the measuring objects, divide the inspection area by grids in Lab coordinates of an Lab chromaticity diagram and integrate numbers of pixels included in each grid with regard to the inspection object and the reference object to create respective Lab chromaticity histogram distributions, and compute a color distribution consistency index that represents a ratio of overlap of the two Lab chromaticity histogram distributions of the inspection object and the reference object so as to inspect color.

It is preferable that the color distribution consistency index is computed by comparing the two pixel integrated numbers of the chromaticity histogram distributions in a grid unit to specify the smaller pixel integrated number, summing up the smaller pixel integrated numbers and computing a ratio of the summed-up pixel integrated numbers to a total number of pixels in the inspection area.

It is preferable that data representing the color distribution consistency index is displayed on a display unit and is sent and received between computers via a communication line.

It is preferable that the camera is mounted to a support assembly to image an inspection object that moves on a production line.

According to a yet further aspect of the invention, there is provided a color inspection method that uses a camera that is configured to have three spectral sensitivities (S1(λ), S2(λ), S3(λ)) linearly and equivalently converted to a CIE XYZ color matching function. The color inspection method comprises the steps of: generating coloring data by conversion of an image which has three spectral sensitivities and is obtained by the camera under illumination into tristimulus values X, Y and Z in a CIE XYZ color system, setting a specified inspection area in the coloring data obtained by imaging the measuring object, computing x, y and z values of the inspection area normalized from X, Y and Z values of each pixel in the inspection area with regard to an inspection object and a reference object as the measuring objects, dividing the inspection area by grids in xyz coordinates of an xyz chromaticity diagram and integrating numbers of pixels included in each grid with regard to the inspection object and the reference object to create respective xyz chromaticity histogram distributions, and computing a color distribution consistency index that represents a ratio of overlap of the two xyz chromaticity histogram distributions of the inspection object and the reference object so as to inspect color. The grid may be a grid or a lattice.

According to another aspect of the invention, there is provided a color inspection method that uses a camera that is configured to have three spectral sensitivities (S1($\lambda$), S2($\lambda$), S3($\lambda$)) linearly and equivalently converted to a CIE XYZ color matching function. The color inspection method comprises the steps of generating coloring data by conversion of an image which has three spectral sensitivities and is obtained by the camera under illumination into tristimulus values X, Y and Z in a CIE XYZ color system, setting a specified inspection area in the coloring data obtained by imaging the measuring object, converting X, Y and Z values of each pixel included in the inspection area into Lab values with regard to an inspection object and a reference object as the measuring objects, dividing the inspection area by grids in Lab coordinates of an Lab chromaticity diagram and integrating numbers of pixels included in each grid with regard to the inspection object and the reference object to create respective Lab chromaticity histogram distributions and computing a color distribution consistency index that represents a ratio of overlap of the two Lab chromaticity histogram distributions of the inspection object and the reference object so as to inspect color.

The camera may be a single camera or a plurality of cameras. The camera may be fixed for imaging or may be moved for imaging. When a plurality of cameras are used, the cameras may be placed in respective locations corresponding to imaging angles.

The camera of the invention preferably images an observation object with three spectral sensitivities (S1($\lambda$), S2($\lambda$), S3($\lambda$)), i.e., in three channels. The means employed for this purpose may be any of, for example, an optical filter, a dichromic mirror or a dichroic prism set to obtain such spectral sensitivities.

The spectral sensitivities (S1($\lambda$), S2($\lambda$), S3($\lambda$)) of the camera are bell-shaped curves that have single peaks and do not take negative values according to the CIE XYZ spectral characteristics, and are obtained by equivalent conversion under the conditions that the respective spectral sensitivity curves have an identical peak value and a minimum overlap. The curve of spectral characteristic S1 has the peak wavelength of 582 nm, the half width of 523 to 629 nm and the $\frac{1}{10}$ width of 491 to 663 nm. The curve of spectral characteristic S2 has the peak wavelength of 543 nm, the half width of 506 to 589 nm and the $\frac{1}{10}$ width of 464 to 632 nm. The curve of spectral characteristic S3 has the peak wavelength of 446 nm, the half width of 423 to 478 nm and the $\frac{1}{10}$ width of 409 to 508 nm.

Advantageous Effects of Invention

The aspects of the invention respond to requests for acquisition, reproduction and analysis of faithful color information in the coloring field, obtain an accurate image color distribution faithful to human eye and accurately and readily inspect the texture such as the lame or pearl texture or the metallic texture and the fine color tint such as concavities and convexities of a product, the human body or the like. The aspects of the invention reduce the computation time and additionally have a wide range of applications and high industrial availability.

BRIEF DESCRIPTION OF DRAWINGS

FIG. 11 is diagrams illustrating concrete examples of method of obtaining image information with three spectral sensitivities (S1($\lambda$), S2($\lambda$), S3($\lambda$)) according to Embodiment 1 of the invention.

FIG. 20A is a diagram illustrating an inspection area T in the arithmetic processing unit 3 according to Embodiment 1 of the invention; FIG. 20B is an xy chromaticity diagram showing a chromaticity area K in the chromaticity diagram corresponding to the inspection area T; FIG. 20C is a diagram showing the chromaticity area K divided in grids G; FIG. 20D is a diagram showing an overlap of chromaticity in an xy two-dimensional chromaticity diagram; FIG. 20E is a diagram showing a minimum distribution; and FIG. 20F is a diagram showing one example of xy chromaticity histogram distribution;

DESCRIPTION OF EMBODIMENTS

Figure 1:
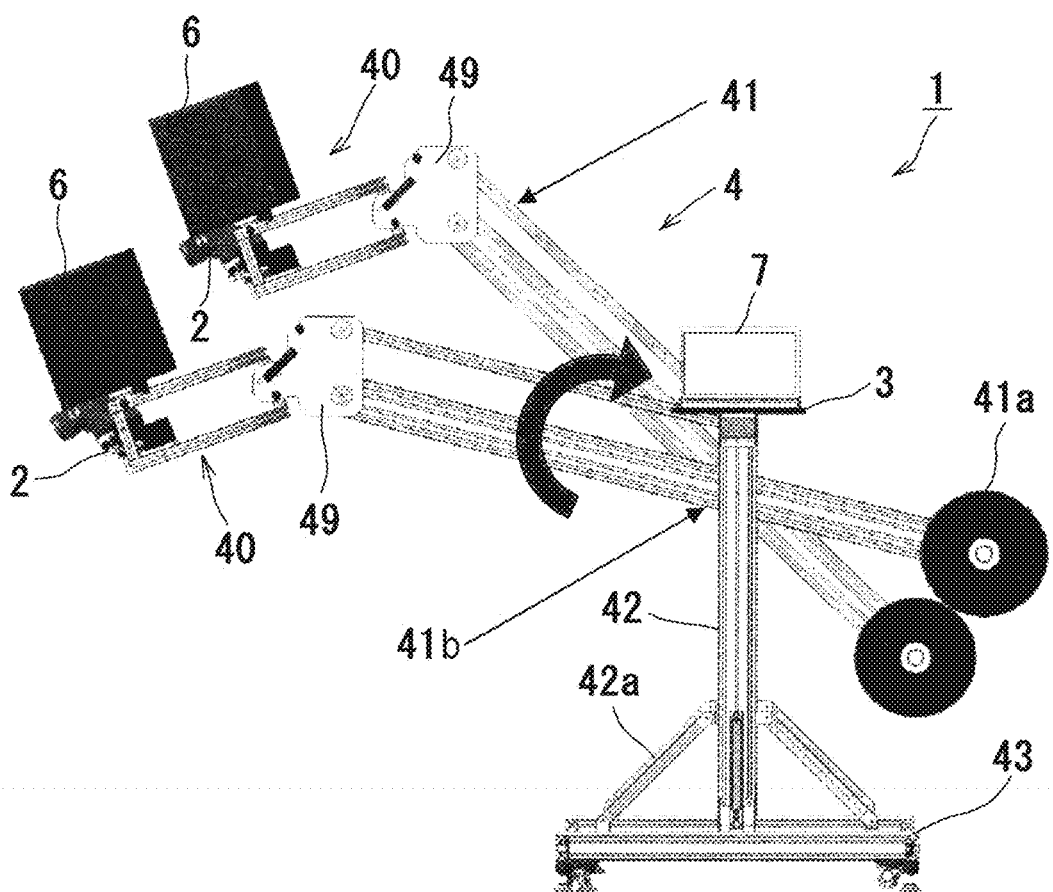
FIG. 1 is a diagram illustrating the operation of a coloring inspection apparatus 1 according to Embodiment 1 of the invention.
Figure 2:
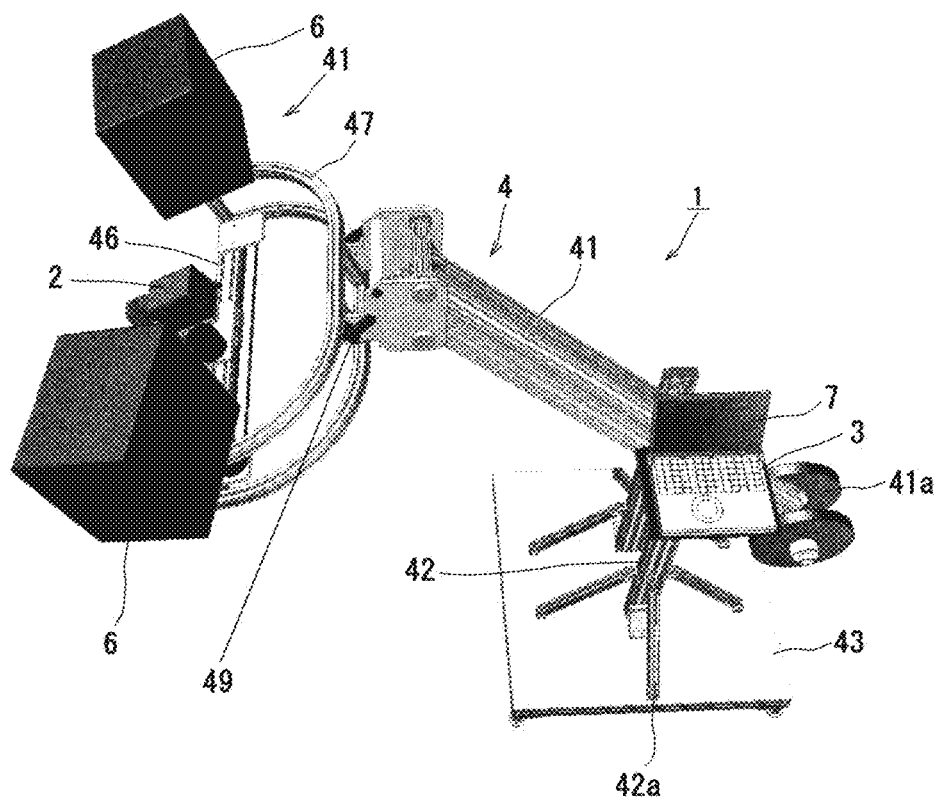
FIG. 2 is a perspective view illustrating the coloring inspection apparatus 1 according to Embodiment 1 of the invention.
Figure 3:
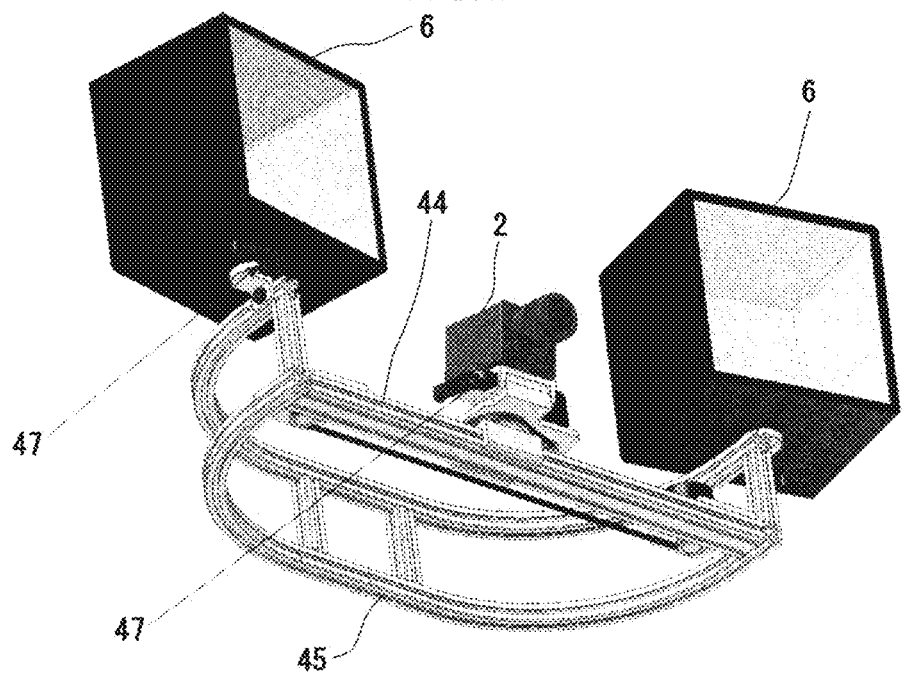
FIG. 3 is a perspective view 1 illustrating an upper portion of the coloring inspection apparatus 1 according to Embodiment 1 of the invention.
Figure 4:
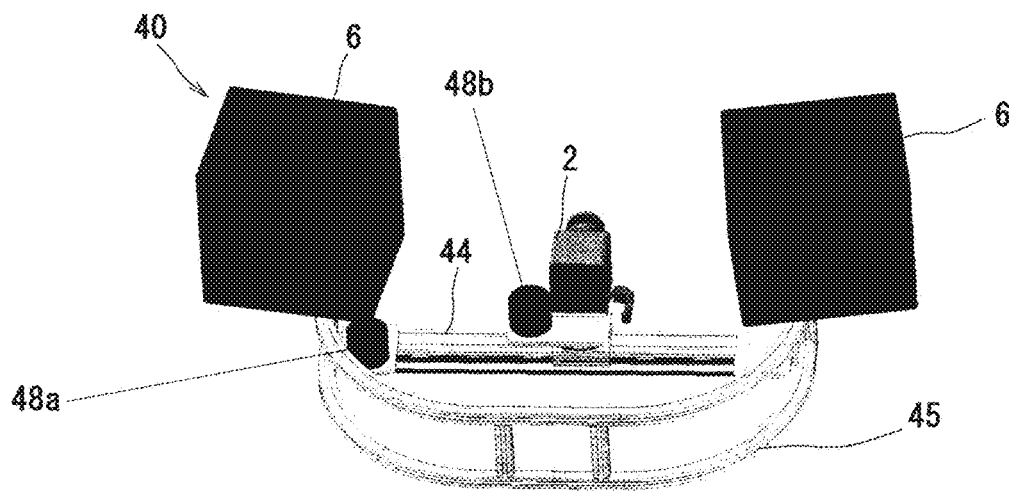
FIG. 4 is a perspective view 2 illustrating the upper portion of the coloring inspection apparatus 1 according to Embodiment 1 of the invention.
Figure 5:
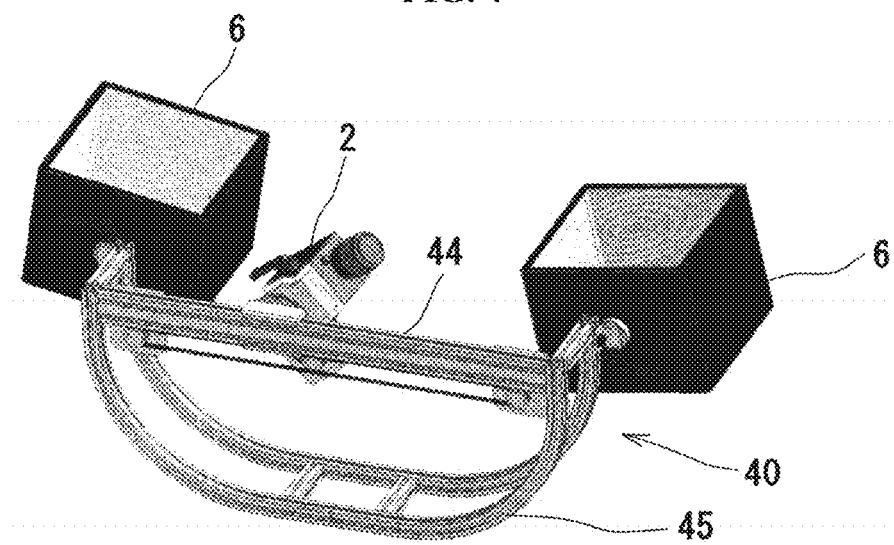
FIG. 5 is a perspective view 3 illustrating the upper portion of the coloring inspection apparatus 1 according to Embodiment 1 of the invention.
Figure 6:
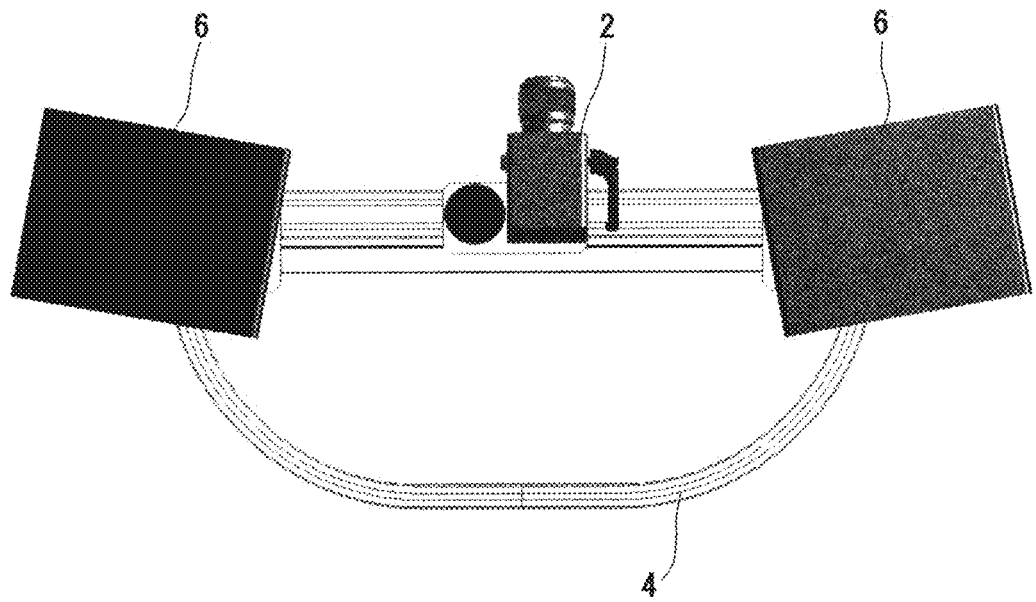
FIG. 6 is a plan view 1 illustrating the upper portion of the coloring inspection apparatus 1 according to Embodiment 1 of the invention.
Figure 7:
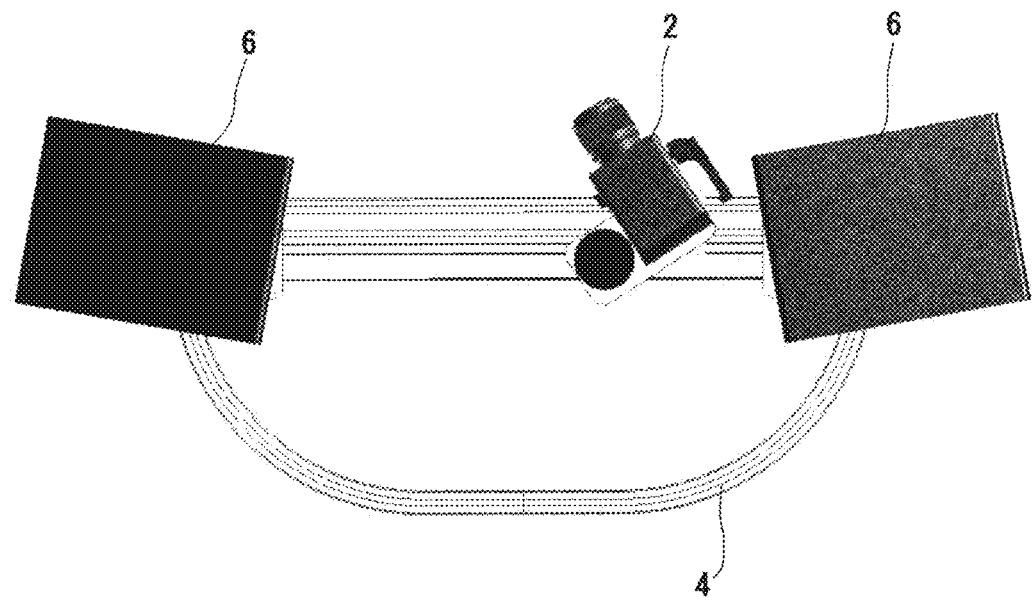
FIG. 7 is a plan view 2 illustrating the upper portion of the coloring inspection apparatus 1 according to Embodiment 1 of the invention.
Figure 8:
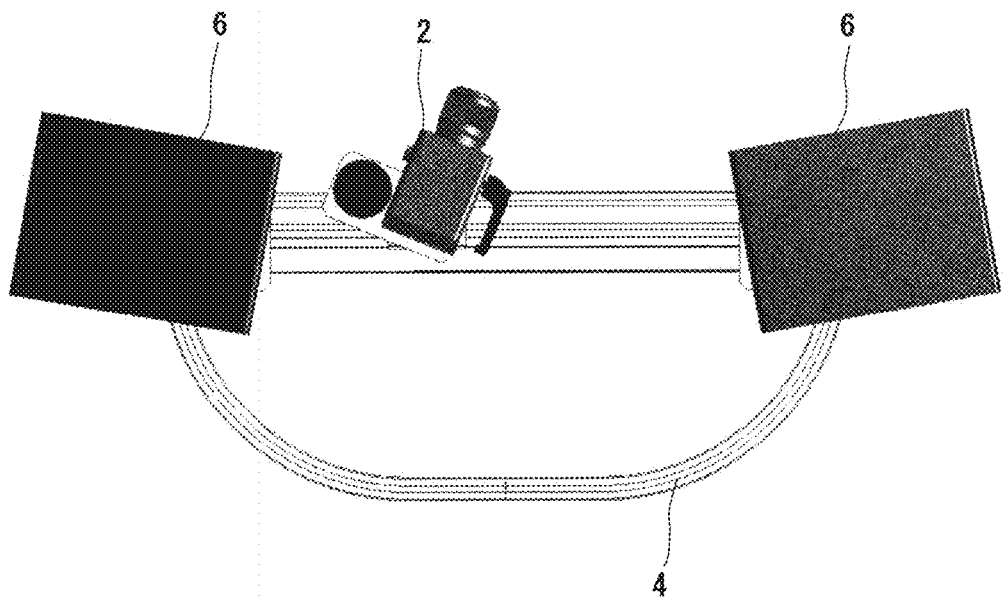
FIG. 8 is a plan view 3 illustrating the upper portion of the coloring inspection apparatus 1 according to Embodiment 1 of the invention.

A coloring inspection apparatus 1 according to preferable Embodiment 1 of the invention is described with reference to FIGS. 1 to 21.

The coloring inspection apparatus 1 includes a camera 2 that is configured to have three spectral sensitivities (S1(λ), S2(λ), S3(λ)) linearly and equivalently converted to a CIE XYZ color matching function, an arithmetic processing unit 3 that is configured to obtain and compute coloring data by conversion of an image which has three spectral sensitivities and is obtained by the camera 2 into tristimulus values X, Y and Z in a CIE XYZ color system, and lighting units 6 that are configured to illuminate an automobile 5 as an example of measuring object. The arithmetic processing unit 3 sets a specified inspection area K in coloring data obtained by imaging a measuring object, computes x and y values of the inspection area K normalized from X, Y and Z values of each pixel in the inspection area K with regard to an inspection object Q and a reference object R as measuring objects, and divides the inspection area K by grids G in xyz coordinates of an xyz chromaticity diagram. The arithmetic processing unit 3 then integrates the numbers of pixels included in each grid G with regard to the inspection object Q and the reference object R to create respective xyz chromaticity histogram distributions, and computes a color distribution consistency index that represents a ratio of overlap of the two xyz chromaticity histogram distributions of the inspection object Q and the reference object R, so as to inspect the color.

The flip-flop provides different views in different angles. The camera 2 is manually moved for imaging in at least three different angles. The camera 2 is placed below the lighting units 6, and the angle of the camera 2 is manually changeable. The coating color of the automobile 5 and its color distribution data are measurable in multiple different angles by the camera 2.

The apparatus of this embodiment also includes a guide assembly 4 to which the camera 2 is mounted to be movable.

Figure 10:
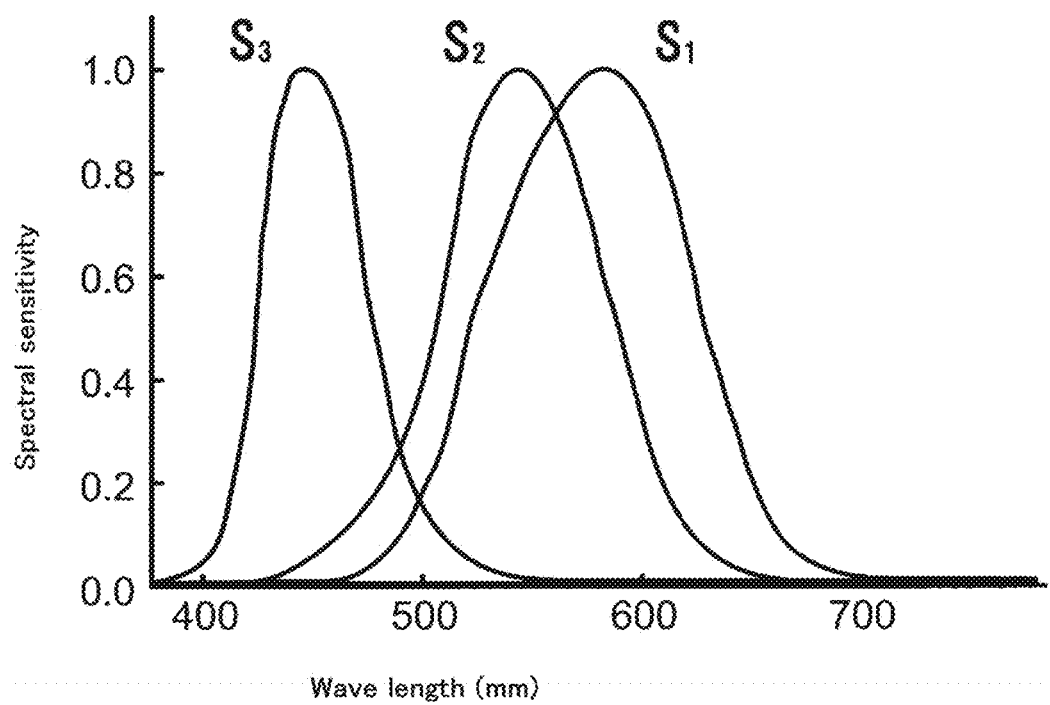
FIG. 10 is a graph showing spectral sensitivities of a camera 2 that is an XYZ color system camera according to Embodiment 1 of the invention.

The spectral sensitivities of the camera 2 satisfy Luther condition. As shown in FIG. 10, the spectral sensitivities (S1(λ), S2(λ), S3(λ)) are converted equivalently from an XYZ color matching function on the conditions that spectral sensitivity curves take no negative values, are bell-shaped curves with single peaks, have an identical peak value and have minimum overlaps. More specifically the spectral sensitivities (S1(λ), S2(λ), S3(λ)) have the following characteristics:

| | Peak Wavelength | Half Width | 1/10 Width |
|---|---|---|---|
| S1 | 582 nm | 523-629 nm | 491-663 nm |
| S2 | 543 nm | 506-589 nm | 464-632 nm |
| S3 | 446 nm | 23-478 nm | 409-508 nm |

The peak wavelength of the spectral characteristic S1 may be regarded as 580±4 nm, the peak wavelength of the spectral characteristic S2 may be regarded as 543±3 nm, and the peak wavelength of the spectral characteristic S3 may be regarded as 446±7 nm.

The three spectral sensitivities (S1(λ), S2(λ), S3(λ)) are calculated according to Mathematical Expression 1 given below. Refer to JP 2005-257827A for the details of spectral characteristics.

$$\begin{bmatrix} S_1(\lambda) \\ S_2(\lambda) \\ S_3(\lambda) \end{bmatrix} = \begin{bmatrix} 0.51151 & 0.60975 & -0.10930 \\ -0.38668 & 1.16031 & 0.07538 \\ 0.0 & 0.0 & 0.56086 \end{bmatrix} \begin{bmatrix} \bar{x}(\lambda) \\ \bar{y}(\lambda) \\ \bar{z}(\lambda) \end{bmatrix} \quad \text{[Math. 1]}$$

The camera has the specifications, for example, the effective frequency of about 500 million pixels, the effective area of 9.93 mm×8.7 mm, the image size of 3.45 μm×3.45 μm, the video output of 12 Bit, the camera interface of GigE, the number of frames (at focusing) of 3 to 7 frames per sec, the shutter speed of 1/15,600 sec to 1/15 sec, the integration time of up to 3 seconds, the S/N ratio of not lower than 60 dB, F mount as the lens mount, the operation temperature of 0° C. to 40° C., and the operation humidity of 20% to 80%.

Figure 9:
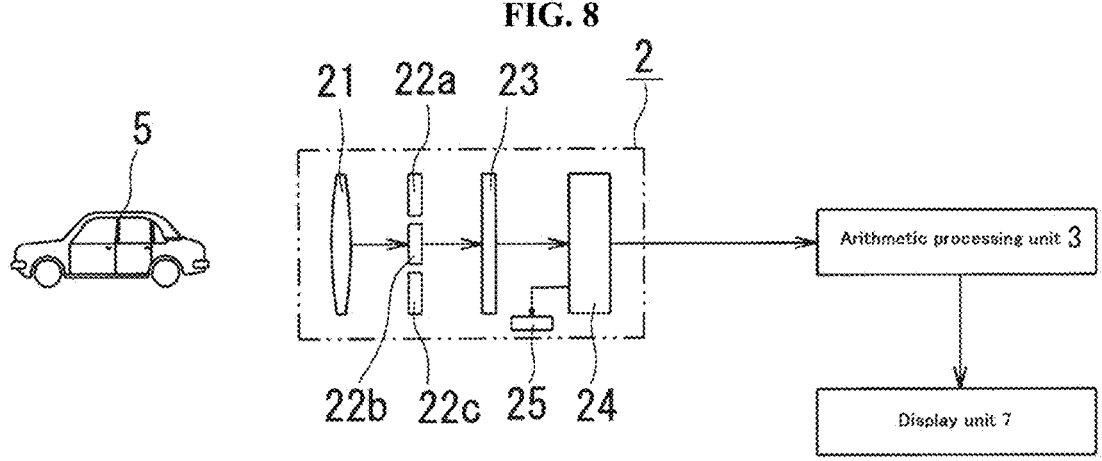
FIG. 9 is a block diagram illustrating the coloring inspection apparatus 1 according to Embodiment 1 of the invention.

The camera 2 includes a photographic lens 21, three optical filters 22a, 22b and 22c located behind the photographic lens 21 and an imaging element 23 (for example, CCD or CMOS) located behind the optical filters 22a, 22b and 22c as shown in FIG. 9. The three spectral sensitivities (S1(λ), S2(λ), S3(λ)) of the camera 2 are given as the products of spectral transmittances of the optical filters 22a, 22b and 22c and the spectral sensitivity of the imaging element 23. The positional relationship between the optical filters 22a, 22b and 22c and the imaging element 23 shown in FIG. 9 is only illustrative. The following describes specific methods of obtaining image information using the three spectral sensitivities (S1(λ), S2(λ), S3(λ)). Embodiment 1 may employ any of these methods or may employ another suitable method.

Figure 11A:
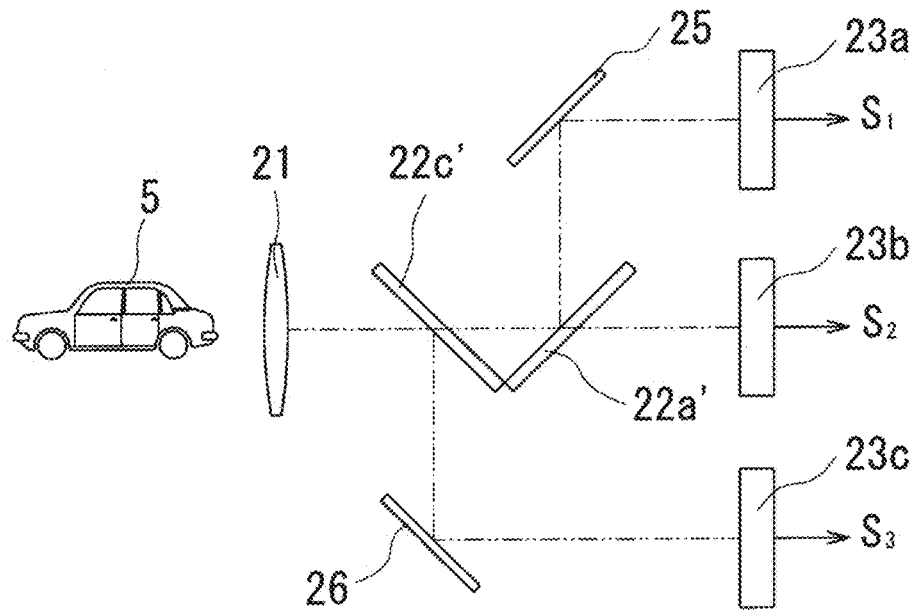
FIG. 11A is a diagram illustrating an example using dichroic mirrors.

FIG. 11A illustrates a method using dichroic mirrors. This method makes light of a specified wavelength reflected by a dichroic mirror 22c', disperses the transmitted light by making light of another specified wavelength reflected by another dichroic mirror 22a', and obtains information from three imaging elements 23a, 23b and 23c arrayed in parallel to one another. In this system, the dichroic mirror 22a' corresponds to the optical filters 22a and 22b, and the dichroic mirror 22c' corresponds to the optical filter 22c. With regard to incident light from a photographic lens 21, light of spectral sensitivity S3 is reflected by the dichroic mirror 22c', and the remaining light is transmitted. The light reflected by the dichroic mirror 22c' is reflected by a reflector 26, and the imaging element 23c provides spectral sensitivity S3. With regard to the light transmitted through the dichroic mirror 22c', on the other hand, light of spectral sensitivity S1 is reflected by the dichroic mirror 22a', and the remaining light of spectral sensitivity S2 is transmitted. The imaging elements 23a and 23b respectively provide spectral sensitivity S1 and spectral sensitivity S2. The dichroic mirrors may be replaced with a dichroic prism having similar characteristics to disperse light into three lights. Imaging elements 23a, 23b and 23c may be applied on the dichroic prism at positions where the respective lights are transmitted.

Figure 11B:
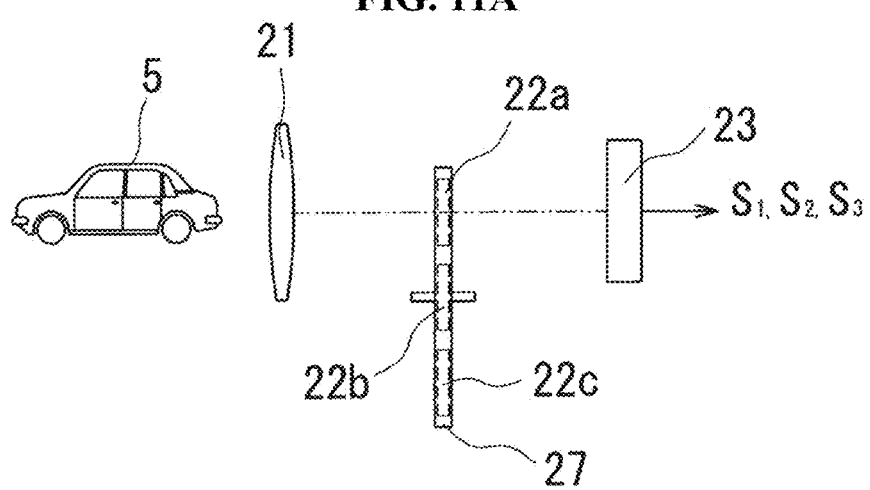
FIG. 11B is a diagram illustrating an example using a filter turret.

FIG. 11B illustrates a method using a filter turret 27. Optical filters 22a, 22b and 22c are provided on the filter turret 27 having an axis of rotation in a direction identical with the direction of incident light from a photographic lens 21 and are mechanically rotated. An imaging element 23 receives the sequentially transmitted lights and provides three spectral sensitivities S1, S2 and S3.

Figure 11C:
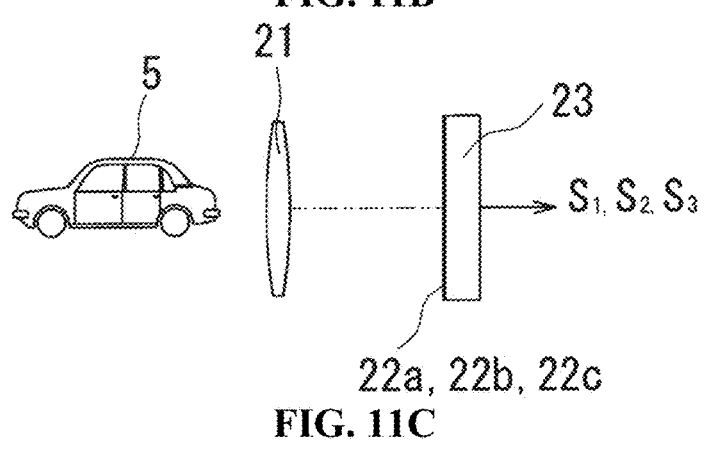
FIG. 11C is a diagram illustrating an example using optical filters 22a, 22b and 22c microscopically applied on an imaging element 23.

FIG. 11C illustrates a method using optical filters 22a, 22b and 22c microscopically applied on an imaging element 23. The optical filters 22a, 22b and 22c are provided in a Bayer array on the imaging element 23. In this array, the optical filer 22b is arranged in half of an area on the imaging element 23 in a grid pattern, and the optical filters 22a and 22c are arranged equally in respective halves of the remaining area. Accordingly, the layout ratio of the optical filter 22a: optical filter 22b: optical filter 22c=1:2:1. The array of the optical filters 22a, 22b and 22c is, however, not necessarily limited to the Bayer array according to Embodiment 1. The respective optical filters 22a, 22b and 22c are microscopic and are applied on the imaging element 23 by printing. The invention is, however, not characterized by this array but is characterized by application of filters characteristic of spectral sensitivities (S1(λ), S2(λ), S3(λ)) on an imaging element.

The camera 2 sends image information obtained with the spectral sensitivities (S1(λ), S2(λ), S3(λ)) to the arithmetic processing unit 3. The arithmetic processing unit 3 converts the image information into tristimulus values X, Y and Z in the XYZ color system and performs an arithmetic operation of normalizing and converting image data of the tristimulus values X, Y Z into x, y and z values. The arithmetic processing unit 3 includes a display unit (not shown) that is configured to display a visualized image.

The arithmetic processing unit 3 computes and visualizes the luminance, the chromaticity and the like at any position in the image obtained by the camera 2. The automobile 5 is obliquely irradiated with light, and a support assembly 4 is manually operated. Color distribution data of the coating color are compared with one another as indexes.

The support assembly 4 includes a head 40, an arm 41 that is comprised of a plurality of beams and is configured to move the head 40, a support column 42 to which the arm 41 is mounted in a rotatable manner, a base 43 that is configured to fix the support column 42 and a reinforcing member 42a that is configured to reinforce the support of the support column 42.

The head 40 includes a linear guide 44 and an arc-shaped member 45 linked with the linear guide 44. Lighting units 6 are fastened to both ends of the head 40 in such a manner that their positions and angles are adjustable by a lamp adjuster 46. The camera 2 is mounted to the linear guide 44 to be movable. A camera angle adjuster 47 is provided to adjust the imaging angle of the camera 2. The head 40 is also provided with a camera shifting adjustment motor 48a and a camera panning adjustment motor 48b. The camera 2 is slidable along the linear guide 44. The head 40 is mounted to the arm 41 to be tiltable by means of a head titling adjuster 49. A weight 41a is fixed to a lower end of the arm 41. The arm 41 is linked with the support column 42 by means of a height adjuster 41b.

The automobile 5 is imaged with the camera 2 at one location. The camera 2 is then moved, and the automobile 5 is imaged with the camera 2 at a different location. For example, the automobile 5 may be imaged at three different locations (any adequate number of locations) such as at the front, 45 degrees left and 45 degrees right.

The coloring inspection apparatus 1 is placed for the automobile 5 as the measuring object. The automobile 5 is extracted at random among a line of automobiles and is subjected to measurement of coating for the purpose of sampling inspection of coating.

A xenon lamp (simulated solar light) is employed as the light source of the lighting unit 6. The lighting unit 6 includes a Fresnel lens assembly, in addition to the xenon lamp. The automobile 5 is uniformly irradiated obliquely downward with the xenon lamp. The xenon lamp may be replaced with an LED artificial sunlight lamp. This may be mounted to a robot arm. The LED artificial sunlight lamp is significantly advantageous since it is small-size and light in weight, satisfies the conditions of the light source for color evaluation and overcomes the problem of chromatic aberration that occurs in general LEDs.

A display unit 7 is connected with the arithmetic processing unit 3 and is configured to receive an image signal processed by the arithmetic processing unit 3 and display an image on the screen. The arithmetic processing unit 3 or the display unit 7 adequately includes an input unit (not shown). The input unit may be, for example, a keyboard, a mouse or a touch panel provided in an image display device.

A light shield cover may be mounted to the coloring inspection apparatus 1 in some circumstances of inspection, although not being specifically illustrated.

Figure 12:
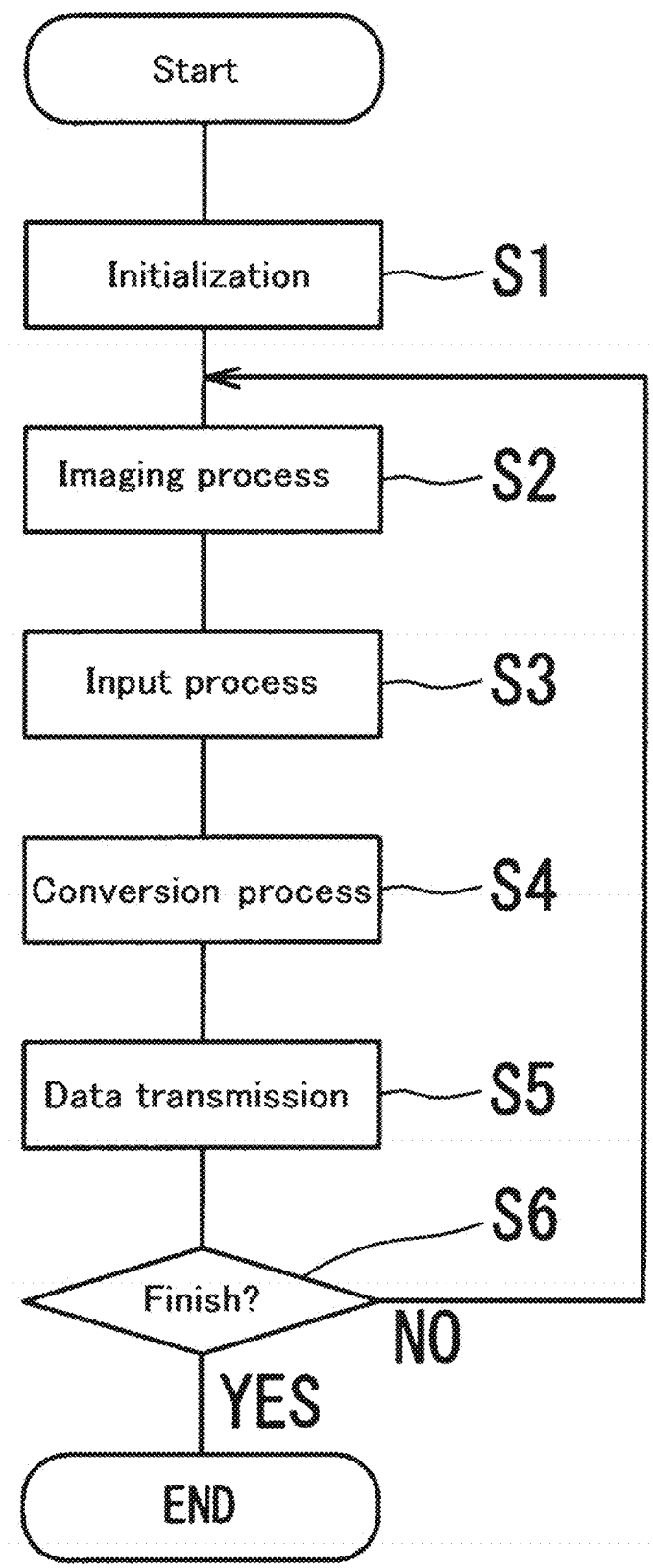
FIG. 12 is a flowchart showing a processing flow by the camera 2 according to Embodiment 1 of the invention.
Figure 13:
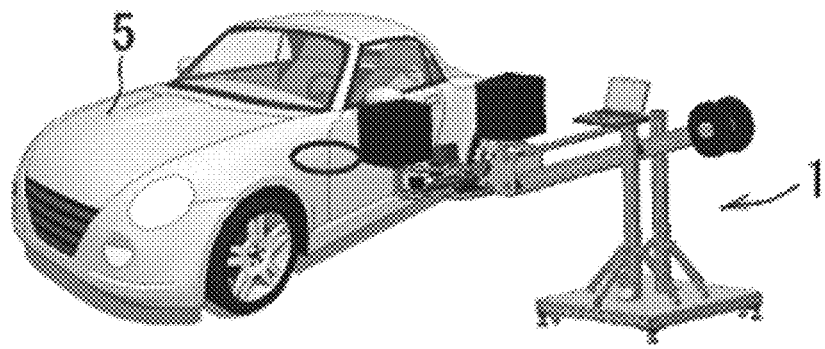
FIG. 13 is a perspective view illustrating Example 1 of imaging the boundary of panels of an automobile 5 with the camera 2 according to Embodiment 1 of the invention.
Figure 14:
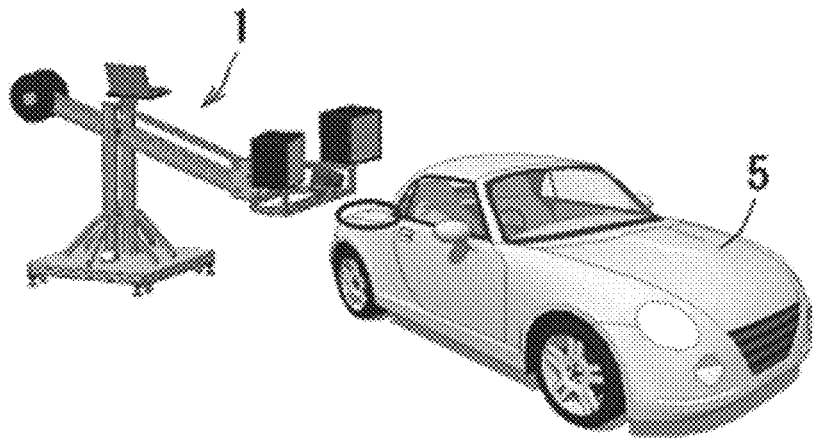
FIG. 14 is a perspective view illustrating Example 2 of imaging the boundary of panels of the automobile 5 with the camera 2 according to Embodiment 1 of the invention.
Figure 15:
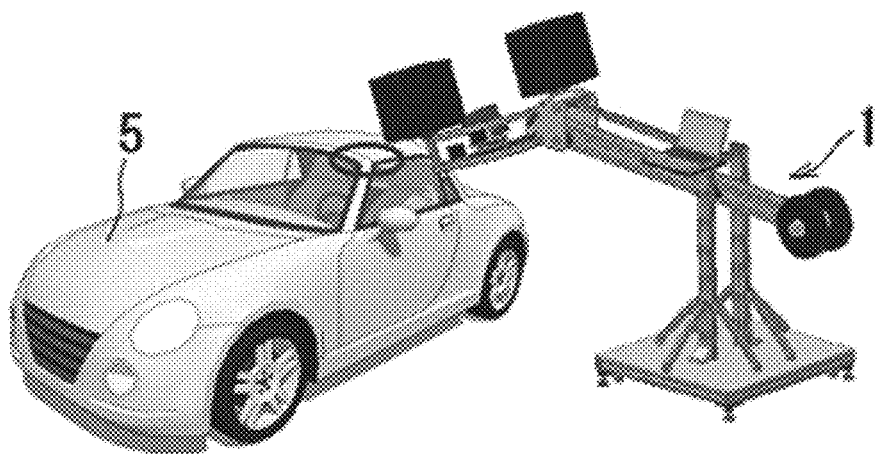
FIG. 15 is a perspective view illustrating Example 3 of imaging the boundary of panels of the automobile 5 with the camera 2 according to Embodiment 1 of the invention.
Figure 16:
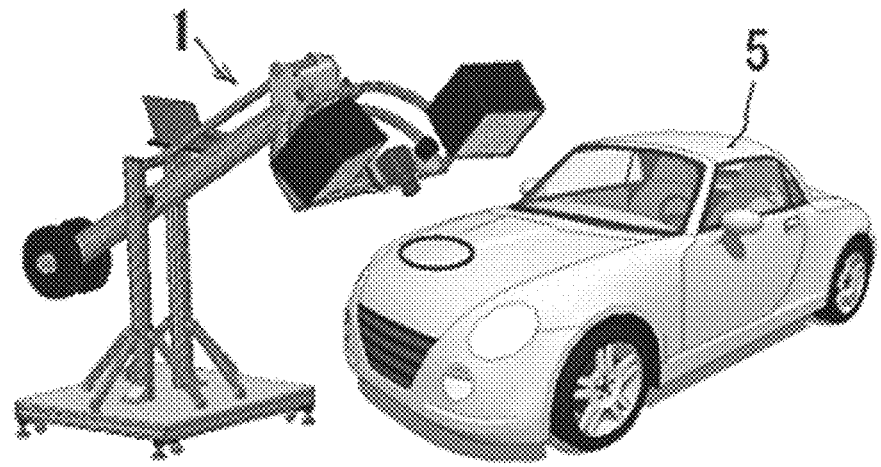
FIG. 16 is a perspective view illustrating Example 4 of imaging the boundary of panels of the automobile 5 with the camera 2 according to Embodiment 1 of the invention.
Figure 17:
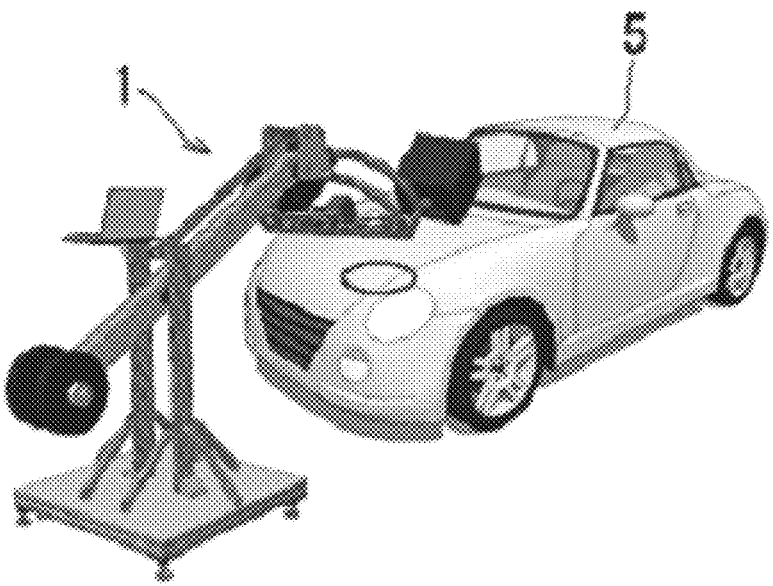
FIG. 17 is a perspective view illustrating Example 5 of imaging the boundary of panels of the automobile 5 with the camera 2 according to Embodiment 1 of the invention.
Figure 19:
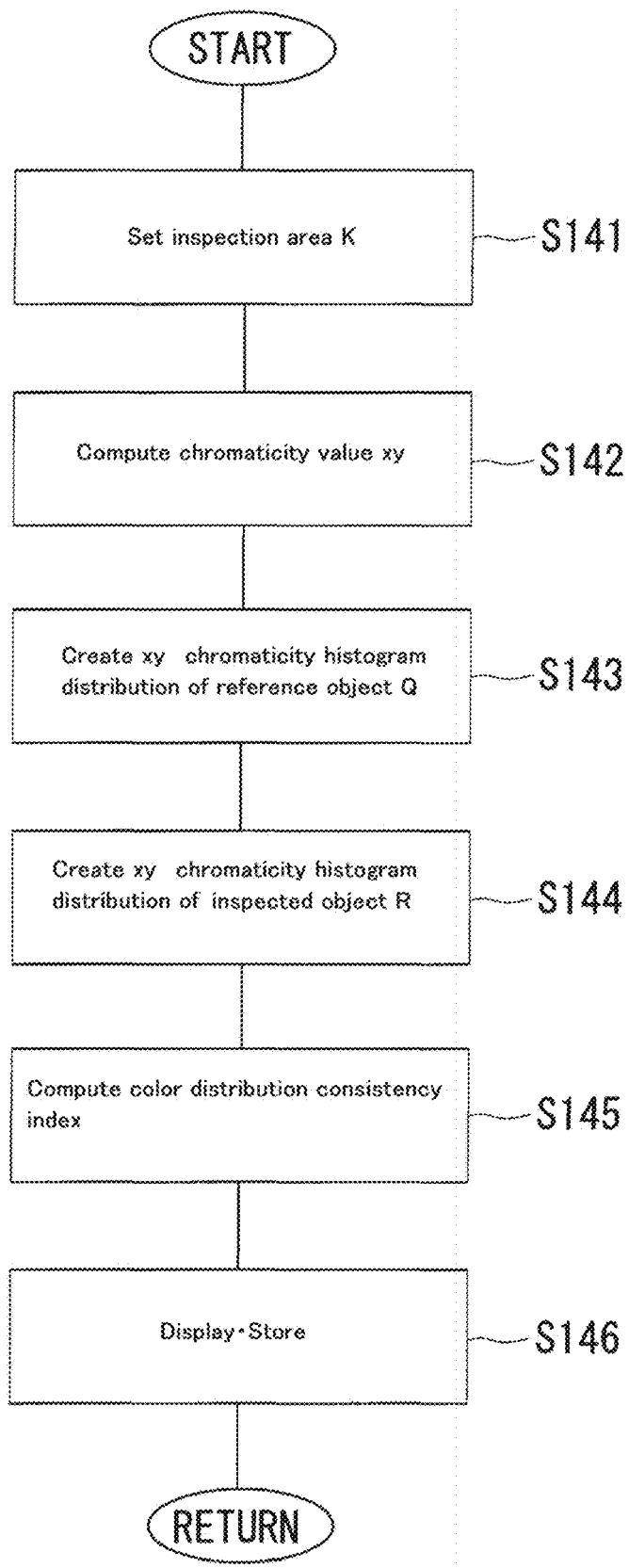
FIG. 19 is a sub-flowchart showing a sub-flow by the arithmetic processing unit 3 according to Embodiment 1 of the invention.

The following describes the operations of the coloring inspection apparatus 1 with reference to a concrete example. As shown in FIG. 9, the coloring inspection apparatus 1 is operated by connection of the camera 2, the arithmetic processing unit 3 and the display unit 7. The method of connection may be freely selectable among various wired and wireless connection techniques. FIG. 12 is a flowchart showing a processing flow by the camera 2, and FIG. 19 is a flowchart showing a processing flow by the arithmetic processing unit 3.

As shown in FIG. 12, when being powered on, the camera 2 is initialized (initialization S1). The camera 2 images the automobile 5 with the spectral sensitivities (S1(λ), S2(λ), S3(λ)) (imaging process S2) and inputs image data by means of the imaging element 23 (input process S3). The input data are converted to tristimulus values X, Y and Z by the arithmetic processing unit 3 (conversion process S4). The spectral sensitivities (S1(λ), S2(λ), S3(λ)) are sent to the display unit 7 (data transmission S5). When the image is a moving image, the series of processing from the imaging process S2 to the data transmission S5 is performed sequentially. The image is displayed on the image display unit 7.

FIGS. 13 to 17 illustrate an example of measuring boundaries of various panels of the automobile 5 at the imaging process S2. The automobile 5 is imaged with the camera 2 at different angles with regard to specified areas encircled by ellipses in different imaging locations. There are a plurality of imaging locations, and any adequate number of imaging locations may be selected. In this example, the panels are measured in three different directions, i.e., at the front (0 degree), 45 degrees left and 45 degrees right. At the location of panel measurement, the optical axis of the camera 2 at 0 degree is perpendicular to the body surface of the automobile 5. Lighting is characterized by obliquely downward lighting like the sunlight.

For the purpose of reference, conversion equations from the tristimulus values X, Y and Z into a Y'xy color system are given as Mathematical Expressions 2 and 3. A luminance meter (not shown) is used together with the camera 2, and the value Y is corrected with a value (nt) of the luminance meter to Y'. The conversion equations in the color space are commonly used, so that the other equations are not specifically shown.

$$x = \frac{X}{X+Y+Z}$$ [Math. 2]

$$y = \frac{Y}{X+Y+Z}$$ [Math. 3]

The imaging process S2 images the automobile 5 with the camera 2 having the three spectral sensitivities (S1(λ), S2(λ), S3(λ)) (as shown in FIGS. 9 and 12). The spectral sensitivities (S1(λ), S2(λ), S3(λ)) are given by above Mathematical Expression 1. The input process S3 is concurrently and sequentially performed with imaging using the photographic lens 21, the optical filters 22a, 22b and 22c and the imaging element 23.

The input image data are values according to the spectral sensitivities (S1(λ), S2(λ), S3(λ)). The arithmetic processing unit 3 converts the image data of the obtained image into tristimulus values X, Y and Z at the conversion process S4. This conversion is performed according to Mathematical Expression 1. More specifically, tristimulus values X, Y and Z are obtained by multiplication of an inverse matrix of the coefficients in Mathematical Expression 1. The camera 2 sends the values according to the spectral sensitivities (S1(λ), S2(λ), S3(λ)) to the arithmetic processing unit 3.

Figure 18:
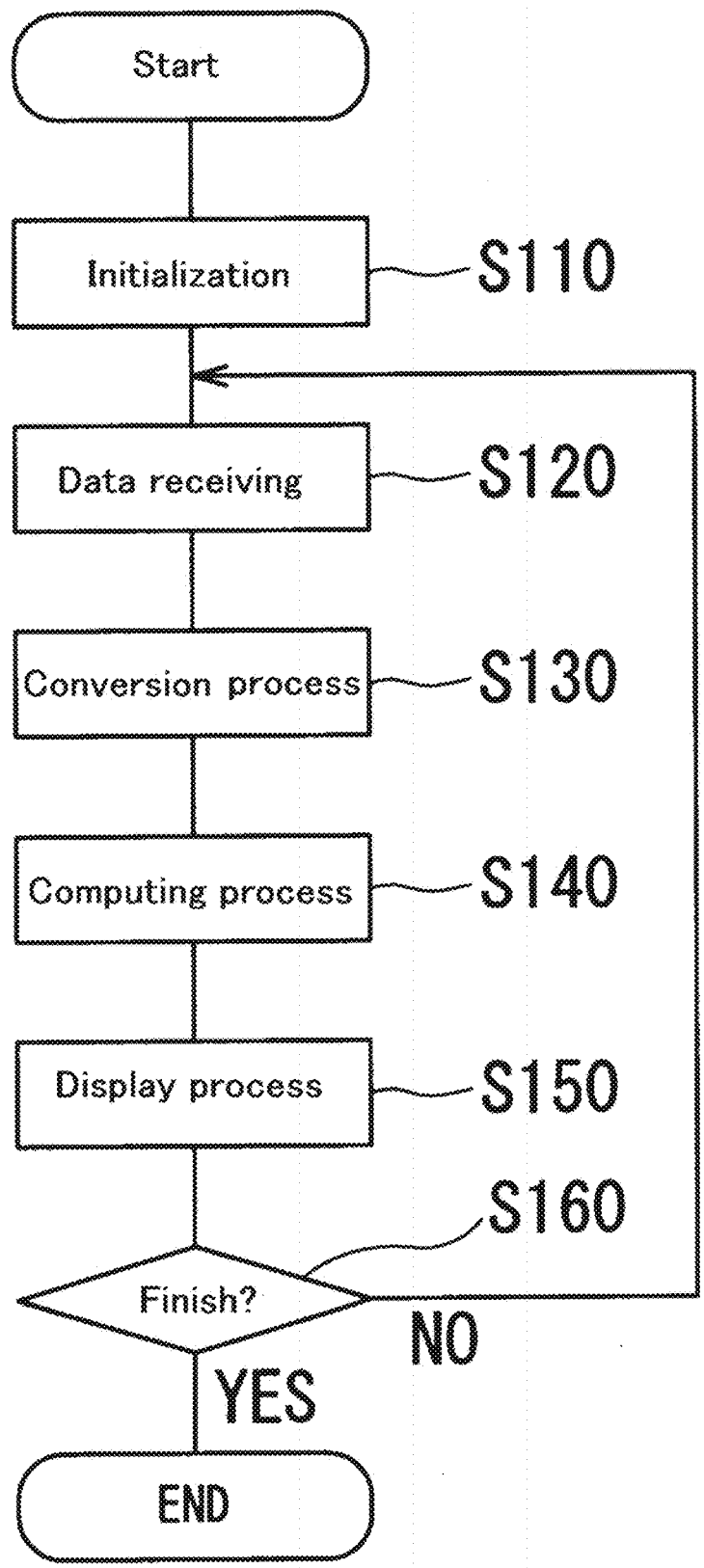
FIG. 18 is a flowchart showing a processing flow by an arithmetic processing unit 3 according to Embodiment 1 of the invention.

As shown in FIG. 18, when being powered on, the arithmetic processing unit 3 is initialized (initialization S110). In the state that the display unit 7 is connected with the camera 2, the arithmetic processing unit 3 receives the spectral sensitivities (S1(λ), S2(λ), S3(λ)) sent from the camera 2 (data receiving S120). The arithmetic processing unit 3 subsequently converts the spectral sensitivities (S1(λ), S2(λ), S3(λ)) into tristimulus values X, Y and Z, computes chromaticity xyz coordinate histograms and computes a color distribution consistency index (S140). The arithmetic processing unit 3 sends the results of computation to the display unit 7 (display process S150). In response to the data receiving S120 from the camera 2, the series of processing from the conversion process S130 to the display process S150 is sequentially performed.

The computation process S140 computes and visualizes the color distribution consistency index of the obtained image and converts color information into, for example, RGB data as required for display on the display unit 7.

The display process S150 displays the visualized color distribution consistency index on the image display device. The processing flow then goes to return.

FIG. 19 is a sub-flowchart showing the details of the process at S140. The process takes a first image of a reference object, takes a second image of an inspection object to be compared, and sequentially calculates the color distribution consistency index as described below. The similarity of the chromaticity is determined using this color distribution consistency index.

The process sets an inspection area K (shown in FIG. 20B) corresponding to a target area T to be inspected (shown in FIG. 20A) with regard to obtained images A and B (step S141). The size and the location of the inspection area K may be set arbitrarily.

The process computes the chromaticity values xy and determines chromaticity values xy (S142). In XY chromaticity histogram distribution data, x+y+z=1, so that computation of z may be omitted. All the chromaticity values xyz may alternatively be computed.

The process creates an xy chromaticity histogram distribution of the reference object Q in the inspection area K cut out from the image A of the inspection object (S143). This chromaticity histogram distribution shows the integrated value by counting the number of pixels included in an overlap area D of two histogram distributions shown in FIG. 20C.

FIG. 20C shows a plane of color distribution of a comparison object at the positions of xyz coordinates. The inspection area K is divided by grids G, and a histogram distribution of pixels having the xyz values in each divisional area is created. Each divisional area is a three-dimensional lattice by dividing the xyz coordinates by grids of a specific width (three-dimensional grids), for example, by dividing xyz coordinates into 1000 (by 1000 lines). The histogram is scanned from one end to the other. The number of pixels included in each divisional area divided in grid G is scanned in an identical xy plane and is integrated in the z direction. Computing the xyz coordinates in only a specified vertical plane or a specified horizontal plane in the inspection area K shortens the computation time. Using the smaller grids increases the accuracy but also increases the computation time. Accordingly grids of adequate size should be used.

Like S143, the process creates a xy chromaticity histogram distribution with regard to the image B of the reference object R (S144). The xy chromaticity histogram distribution shows the integrated number of pixels. FIG. 20D shows an overlap area.

Instead of the xyz values in the XYZ space, Lab values in a Lab space may be computed from the XYZ values prior to normalization according to Mathematical Expression 4 given below. The Lab color space is a type of complementary color space and has a dimension L representing the brightness and complementary color dimensions A and B. This is based on the nonlinearly compressed coordinates in a CIE XYZ color space. Conversion from the XYZ values prior to normalization into Lab values by Mathematical Expression 3 provides a degree of consistency in the Lab color space which adds the brightness dimension compared with the degree of consistency in the XYZ color space.

$$f(t) = \begin{cases} t^{1/3} & \text{When } t > (6/29)^3 = 0.008856\ldots \\ [(29/3)^3 t + 16]/116 & \text{Otherwise} \end{cases}$$ [Math. 4]

$$L^* = 116 f(Y/Y_n) - 16$$
$$a^* = 500 \, [f(X/X_n) - f(Y/Y_n)]$$
$$b^* = 200 \, [f(Y/Y_n) - f(Z/Z_n)]$$

In the case of computation of the chromaticity histogram distribution in the Lab space corresponding to the inspection area K, the XYZ values are converted into the Lab values. The degree of consistency is computed from the xyz chromaticity values in the distribution of a three dimensional space of L axis, a axis and b axis. The Lab values of the inspection object Q and the reference object R in the lab space coordinates are respectively expressed as $U_1(L,a,b)$ and $U_2(L,a,b)$. In the Lab color space, each histogram distribution is in a globe-like shape, and two histogram distributions are overlapped three-dimensionally. The inspection area K in the three-dimensional space is divided by grids, and a chromaticity histogram distribution and a minimum distribution of $U_1(L,a,b)$ and $U_2(L,a,b)$ in the three dimensions are determined, and the degree of consistency is similarly computed. The integrated number of grids is projected on a plane, and the integrated number of overlap areas on the grids is computed in the plane by similar integration. In the case of xyz chromaticity, the information on brightness is lost, so that the degree of consistency is specified by only the color information. In the Lab space, on the other hand, a change in brightness of the image leads to a change in L value. The distributions of the degree of consistency D1 and D2 are shifted in position in the Lab space. This allows for determination taking into account the brightness. This is because the different brightness of an image leads to the different position of the distribution even at the same identical xyz chromaticity. For example, the Lab chromaticity histogram distribution is shifted downward with a decrease in brightness and is shifted upward with an increase in brightness.

The process computes a color distribution consistency index (S145) and goes to Return. This index is computed according to an equation given below. The xy chromaticity histogram distribution shows the integrated number of pixels. FIG. 20D shows an overlap area D, and FIG. 20E shows a minimum distribution.

color distribution consistency index=integrated number of pixels included in overlap area D/total number of pixels in inspection area K×100(%)

FIGS. 20D and 20E show one cross section taken on an S-S line of FIG. 20C. There is an overlap on the same line in the xy coordinates. As a matter of convenience, the cross section is shown in two dimensions, instead of three dimensions. The histogram is a distribution in a small steplike shape. An integrated number $H_A$ and an integrated number $H_B$ in FIG. 20D respectively correspond to the image A and the image B. Comparison of the two histogram distributions provides the overlap area D.

In FIG. 20E, $H_A(x1,y1)$ denotes the integrated number of the xy chromaticity histogram distribution of the inspection object Q, and $H_B(x1,y1)$ denotes the integrated number of the xy chromaticity histogram distribution of the inspection object R. In a left side area of the overlap area, $H_A > H_B$. In the overlap area, $H_A = H_B$. In a right side area, $H_A < H_B$. The smaller integrated number (pixel frequency) between $H_A$ and $H_B$ is $H_A$ in the left side area and $H_B$ in the right side area. This provides a minimum distribution that is a steplike histogram curve as shown by the thick line. The ratio of the overlap area D to the overall area may be calculated by using the minimum distribution.

The smaller integrated number is specified in the minimum distribution. The integrated number in the overlap area D is computable by summing up the smaller integrated number between $H_A$ and $H_B$. The ratio to the total number of pixels is then determined. The total number of pixels in the inspection area K is fixed. The inspection object Q and the reference object R have an identical total number of pixels. This ratio may be integrated three-dimensionally with regard to all the grids G. Alternatively the distribution of the integrated number of pixels may be computed two-dimensionally, for example, by cutting the inspection area K along the S-S line and changing the value x from one end to the other while fixing the value y to a specified value as shown in FIG. 20C. FIG. 20F is a two-dimensional map showing the results of integration on the xy coordinates. The case having no distribution and no number of pixels in the inspection area K is excluded from the computation.

The process lastly performs display and storage process and transmission process (S146) and goes to Return.

For example, it is assumed that the number of pixels included in the inspection area K is 100 pixels×100 pixels=10,000 pixels. Each image is cut in the same inspection area K, so that both the image A and the image B have the same total number of pixels, 10,000 pixels. The number of pixels in the overlap area is integrated from the xyz chromaticity histogram. The integrated number of 5,000 indicates the color distribution consistency index of 50%. The degree of difference of chromaticity is increased with a decrease in color distribution consistency index from 100%. The color distribution consistency index of 100% indicates the complete consistency of the distribution of the xyz values. The product having the color distribution consistency index of or above a predetermined value is evaluated as the conforming product.

The color information obtained primarily from an image is three spectral sensitivities ($S1(\lambda)$, $S2(\lambda)$, $S3(\lambda)$) by a function equivalent to an XYZ color matching function. Compared with color information in RGB, this color information is more faithful to the sensitivity of human eye and the higher accuracy. This provides small overlap of the spectral sensitivities ($S1(\lambda)$, $S2(\lambda)$, $S3(\lambda)$) and a sufficiently high S/N ratio, and a natural change in curves of spectral sensitivities. This accordingly minimizes the error in colorimetry.

The texture of the image may be shown by the histogram distribution. Even the subtle color difference is thus determinable by reflecting the difference of the color texture (for example, metallic texture, shiny texture, mottled pattern, color pattern or rough texture).

Figure 21A:
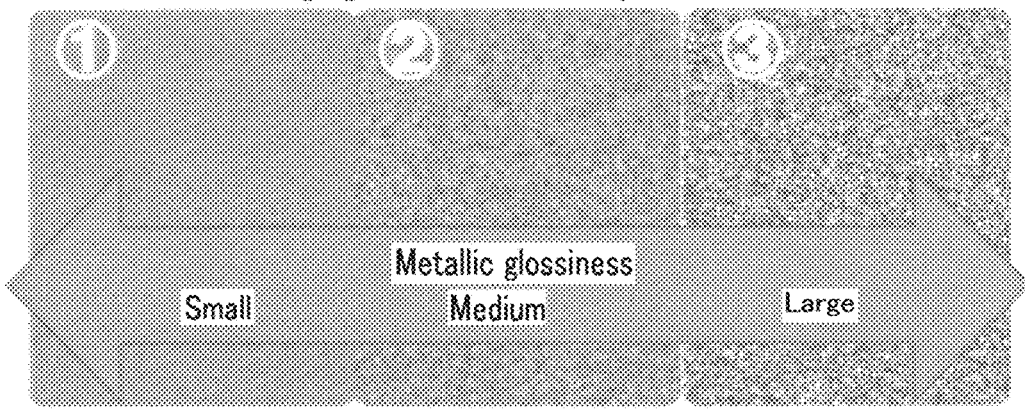
FIG. 21A is a diagram showing the metallic degrees of measurement objects.
Figure 21B:
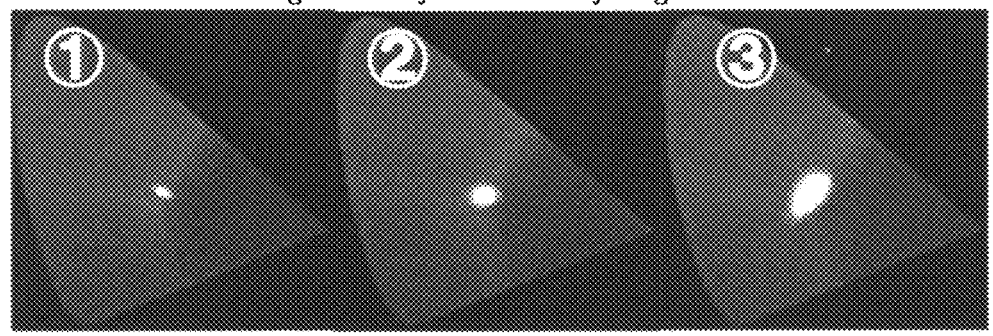
FIG. 21B is a diagram showing xy chromaticity histogram distributions.
Figure 21C:
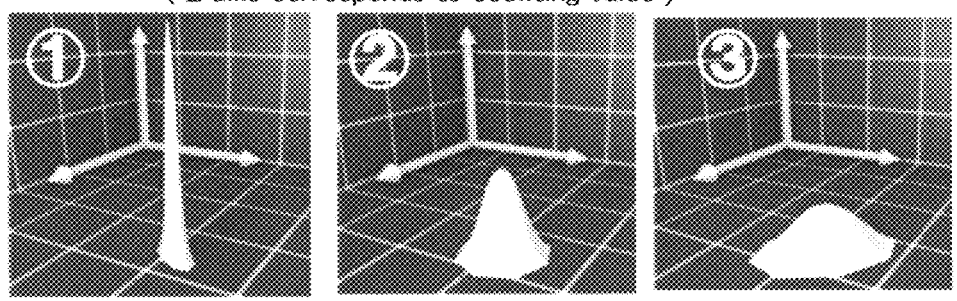
FIG. 21C is a three-dimensional image diagram showing xy chromaticity histogram distributions.

The following describes an inspection example of three objects having different levels of metallic texture with reference to FIGS. 21A to 21C. The object having the lowest metallic texture is Reference Object 1, the object having the medium metallic texture is Inspection Object 2, and the object having the highest metallic texture is Inspection Object 3. Distributions of the respective objects 1 to 3 that are subjected to the above series of processing are created in the xy chromaticity diagram. As shown by the xy chromaticity diagram of FIG. 21B, these distributions are given as data of integration of the highlighted areas. The integrated number is expressed by brightness. The brighter color indicates the larger integrated number. FIG. 21C schematically shows the integrated number of the reference object and the inspection objects in three dimensions. The xy axes show the chromaticity, and the z axis shows the integrated number. Basically, the higher metallic texture provides the lower and gentler peak, and the lower metallic texture provides the sharper peak. The glittering material (aluminum flakes) as the basis of the metallic texture is shined at its small projections and the like, when being illuminated with light. This shiny texture is physically attributed to optical diffraction. The color distribution consistency index representing the degree of overlap is computed by comparison between two histogram distributions of Reference Object 1 and Inspection Object 2 or 3.

As shown in Table 1, the comparative example uses Lab values calculated as average values of the color having ΔE as the basis of the texture. This provides only small differences in Lab values and ΔE relative to the visual appearance and thereby leads to a difficulty in inspection. The color distribution consistency index of this embodiment uses the integrated number in the range of the inspection area K. Inspection Object 2 and Inspection Object 3 respectively have the color distribution consistency indexes of 58% and 27% relative to Reference Object 1. This allows for the clear and easy numerical discrimination of the metallic texture.

TABLE 1

Comparison between Reference Object 1 and Inspetion Objects 2 and 3

|  | L value | a value | b value | ΔE | Distribution consistency index |
|---|---|---|---|---|---|
| ① | 50.40 | −1.96 | 10.60 | — | — |
| ② | 50.52 | −1.97 | 10.21 | 0.121 | 58% |
| ③ | 51.13 | −1.96 | 10.45 | 0.740 | 27% |

A coloring inspection apparatus 101 of Embodiment 2 is described below with reference to FIGS. 22 and 23. Like components are expressed by like numerals in 100s and are not specifically described. The following mainly describes the differences.

The coloring inspection apparatus 101 includes a camera 102 that is configured to image automobiles 105 as a reference object and an inspection object, an arithmetic processing unit 103 that is connected with the camera 102 via a switch 106 and is configured to receive signals and compute a color distribution consistency index, and a display unit 107 that is connected with the arithmetic processing unit 103 and is configured to display the index.

Figure 22:
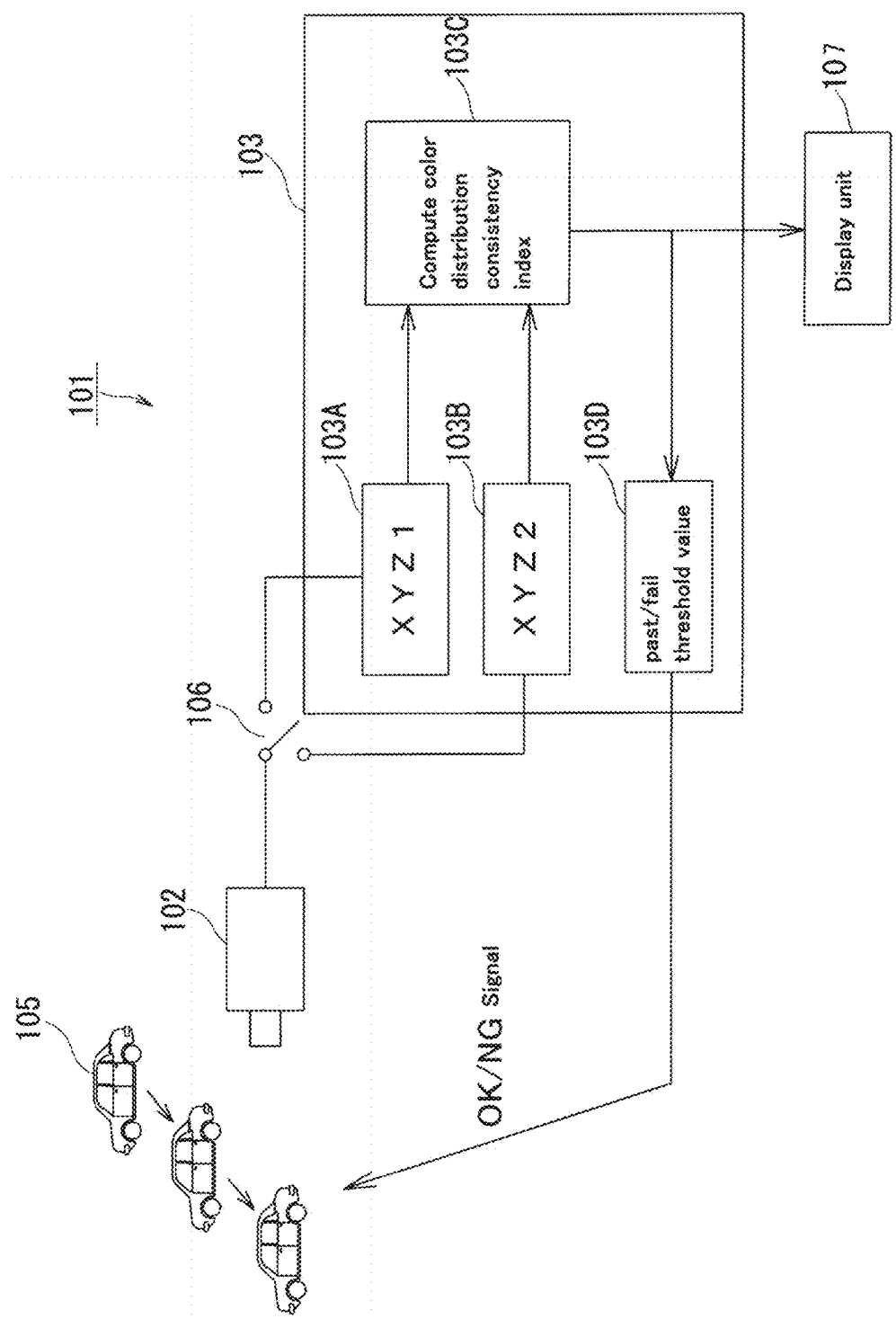
FIG. 22 is a block diagram illustrating the configuration of a coloring inspection apparatus 101 according to Embodiment 2 of the invention.

As shown in FIG. 22, the arithmetic processing unit 103 includes an operator 103A that is configured to compute stimulus values XYZ1 obtained by imaging the automobile 105 as a reference object R, an operator 103B that is configured to compute stimulus values XYZ2 obtained by imaging the automobile as an inspection object, and an operator 103C that is connected with the operators 103A and 103B and computes a color consistency index of the automobile. An OK signal or an NG signal from the operator 103C is sent to the display unit 107 or is sent to the outside. The switch 106 is configured to selectively input the stimulus values XYZ1 or the stimulus values XYZ2. The automobile is only illustrative as the object.

Figure 23:
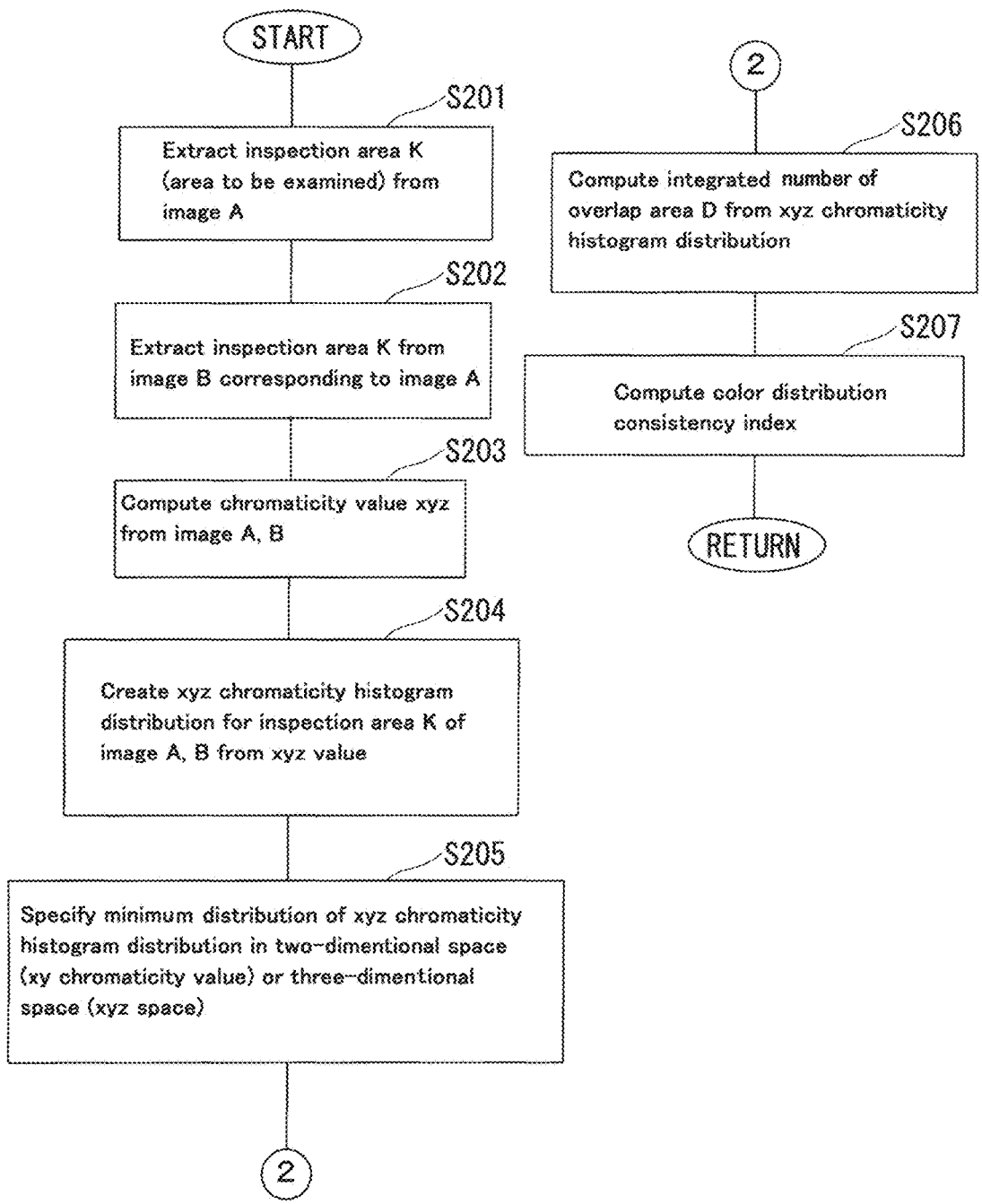
FIG. 23 is a flowchart showing a processing flow by an arithmetic processing unit 103 in the coloring inspection apparatus 101 according to Embodiment 2 of the invention.

FIG. 23 is a flowchart showing a process of computing the color distribution consistency index by comparison of chromaticity histogram distributions of two images A and B. As shown in FIG. 23, when the program is activated, the process extracts, specifies and sets an inspection area K from the image A (S201). The process subsequently extracts, specifies and sets an inspection area corresponding to that of the image A from the image B (S202). The process computes chromaticity values xyz from the images A and B (S203). The process respectively computes and creates xyz chromaticity histogram distributions of the inspection object Q and the reference object R with regard to the inspection area K (S204) and specifies a minimum distribution of the xyz chromaticity histogram distributions (S205). The process then computes the integrated number of the xyz chromaticity histogram distributions with regard to an overlap area D (S206). The xyz chromaticity histogram distributions may be replaced by xy chromaticity histogram distributions having a fixed z value. The process subsequently computes a color distribution consistency index (S207) and goes to Return. The color distribution consistency index=(integrated number of pixels included in overlap area D/total number of pixels in inspection area K)×100(%). The smaller integrated number between $H_A$ and $H_B$ is added and computed to determine the integrated number in the overlap area.

A coloring inspection apparatus 201 of Embodiment 3 is described below with reference to FIG. 24. Like components are expressed by like numerals in 200s and are not specifically described. The following mainly describes the differences.

Figure 24:
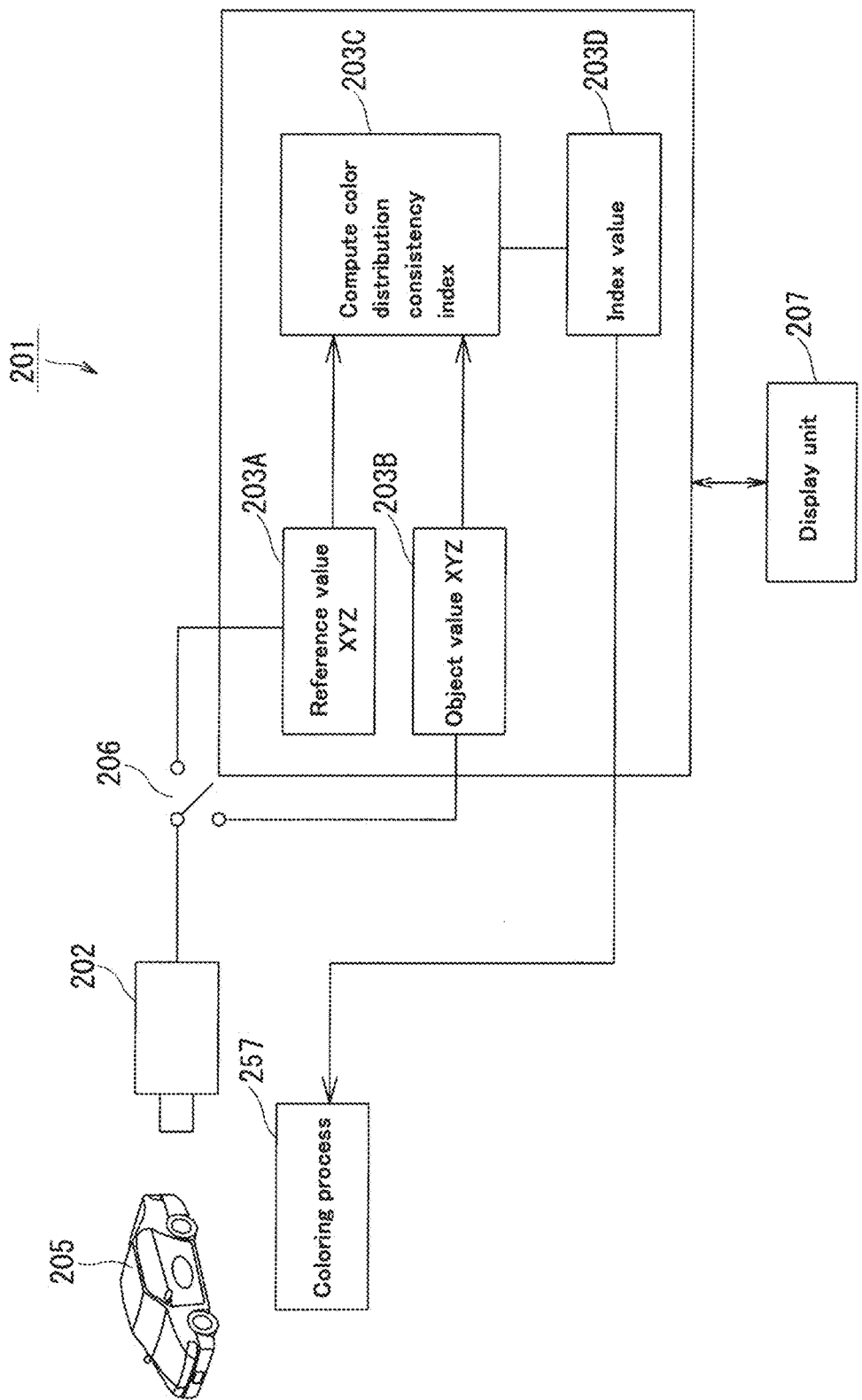
FIG. 24 is a block diagram illustrating the configuration of a coloring inspection apparatus 201 according to Embodiment 3 of the invention.

As shown in FIG. 24, a color determination object is a partial area of an automobile 5, and a camera 202 is configured to image the object area of the automobile 5. An arithmetic processing unit 203 includes an operator 203A that is configured to compute stimulus values XYZ1 as the reference, an operator 203B that is configured to compute stimulus values XYZ2 as the determination object, and an operator 203C that is connected with the operator 203A and the operator 203B and is configured to compute a color consistency index. The index value from the operator 203C is sent to a coloring device 257. The coloring device 257 checks the display of the automobile 5, determines whether the coating color of the automobile 5 is adequate color based on the index value, and performs additional coloring operation as appropriate. A switch 206 is configured to selectively input the reference values XYZ or the object values XYZ. The main processing flow generally follows the flowchart of Embodiment 1 or Embodiment 2 and is not specifically described here.

Figure 25:
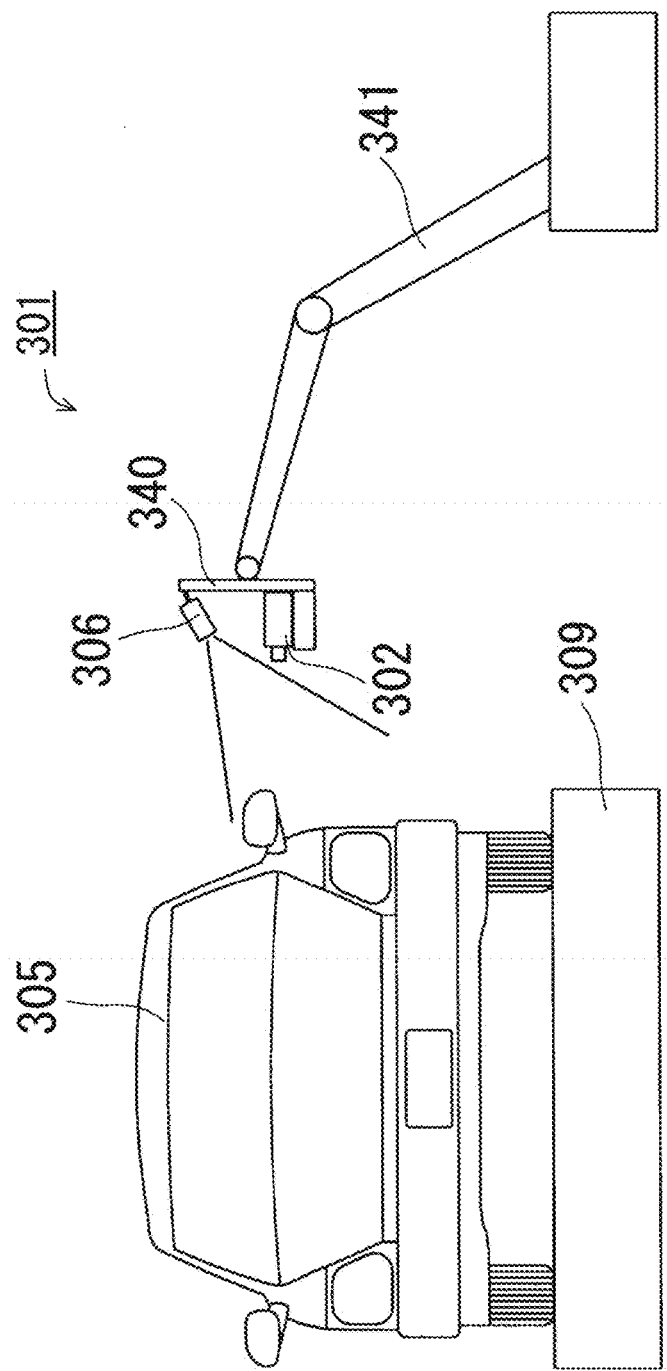
FIG. 25 is a diagram illustrating the configuration and the operation of a coloring inspection apparatus 301 according to Embodiment 4 of the invention.
Figure 26:
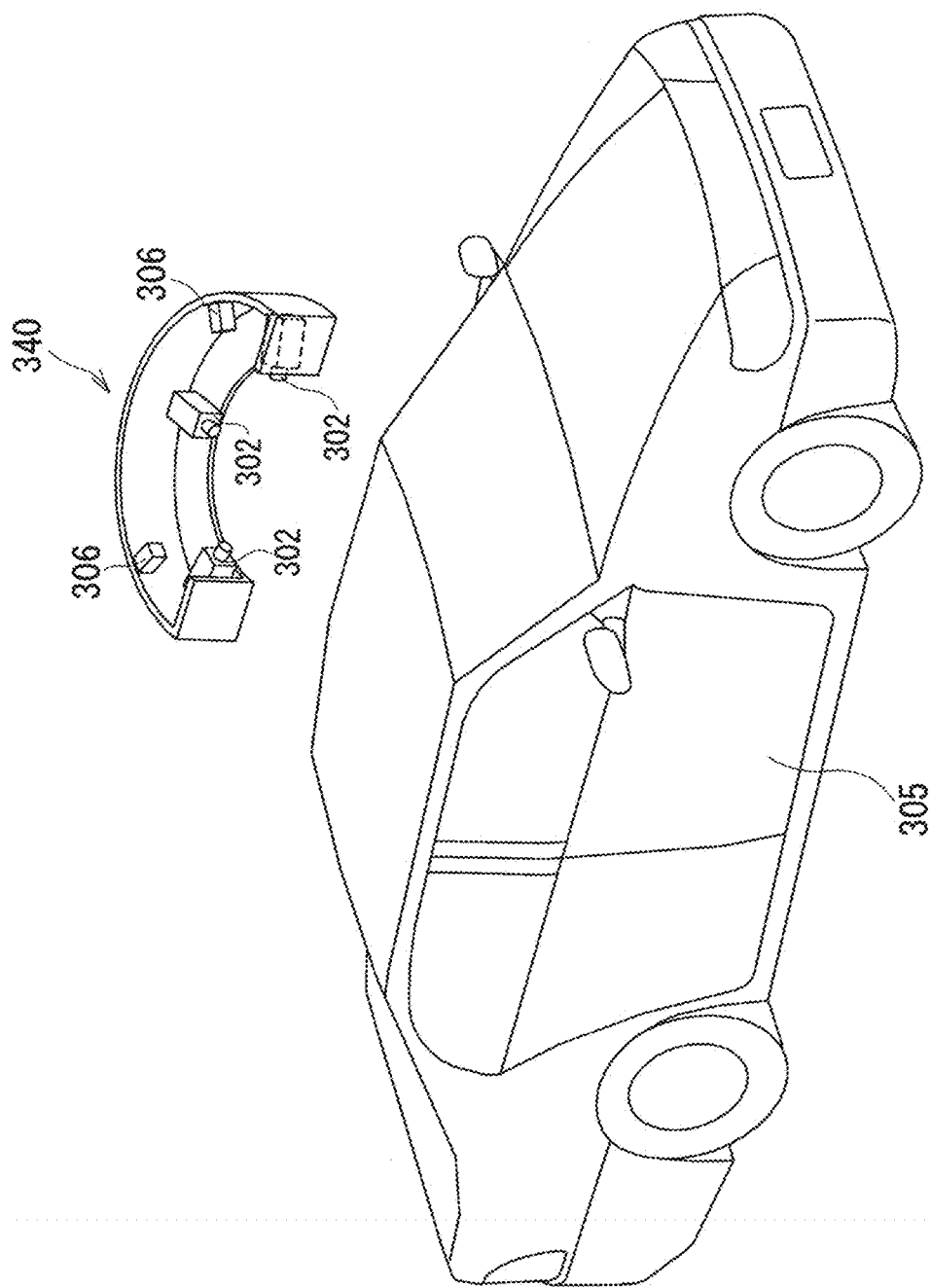
FIG. 26 is a block diagram illustrating the configuration of the coloring inspection apparatus 301 according to Embodiment 4 of the invention.

A coloring inspection apparatus 301 of Embodiment 4 is described below with reference to FIGS. 25 and 26. Like components are expressed by like numerals in 300s and are not specifically described. The following mainly describes the differences.

This embodiment differs from the above embodiment by that the support assembly 4 is replaced by a robot arm 341 and that the angle of a camera 302 is automatically changeable by a motor (not shown). A camera 302 is moved to each desired location for observing an automobile 305 that moves along an automobile production line 309 and is configured to image the automobile 305 in a plurality of locations at different angles and measure the color distribution. The automobile 305 is stopped and imaged adequately.

The configuration of the first embodiment manually changes the imaging angle to evaluate coating of the automobile 5. The configuration of the fourth embodiment, on the other hand, automatically changes the imaging angle. A head 340 is provided on an end of the robot arm 341 to allow for online measurement. Lighting units 306 are set to irradiate the automobile 305 obliquely downward from both sides. The camera 302 is arranged to be movable by motor driving around the automobile 305. The head 340 has an arc-shaped body. The lighting units 306 are fastened to this body, and the camera 302 is movable in the arc-shaped trajectory along this body.

In the inline inspection, it is preferable to cover the lighting units and the camera with the light shielding cover. Embodiments 1 to 3 described above may not use the light shielding cover. In the case of inspection using the robot arm 341 during the inline flow in the plant, it is preferable to cover the lighting units 306 and the camera 302 with the light shielding hood.

The body of the automobile 305 is generally viewed from predetermined locations, and a plurality of angles may be specified in advance. The appearance of the automobile 305 may be imaged from various angles with the camera 302 in the automobile production line 309. The lighting units 306 irradiate the automobile 305 obliquely downward and cause the reflected light to directly go down. This embodiment uses a single movable camera 302, but may use a plurality of movable cameras. Alternatively this embodiment may use a plurality of cameras mounted to the head 340 to be adjustable in position.

In the case of 100% inline inspection, for the more accurate measurement, the left and right angles may be adjusted more finely. This embodiment may employ a system of scanning the automobile 5 for inspection with the camera.

As an application of the inline system, the coloring inspection apparatus may be mounted to, for example, a robot arm in a production line. Incorporating the coloring inspection apparatus in the production line allows for 100% inspection. Combination with the machine control of the robot arm ensures 100% inspection in a wider area.

Figure 27:
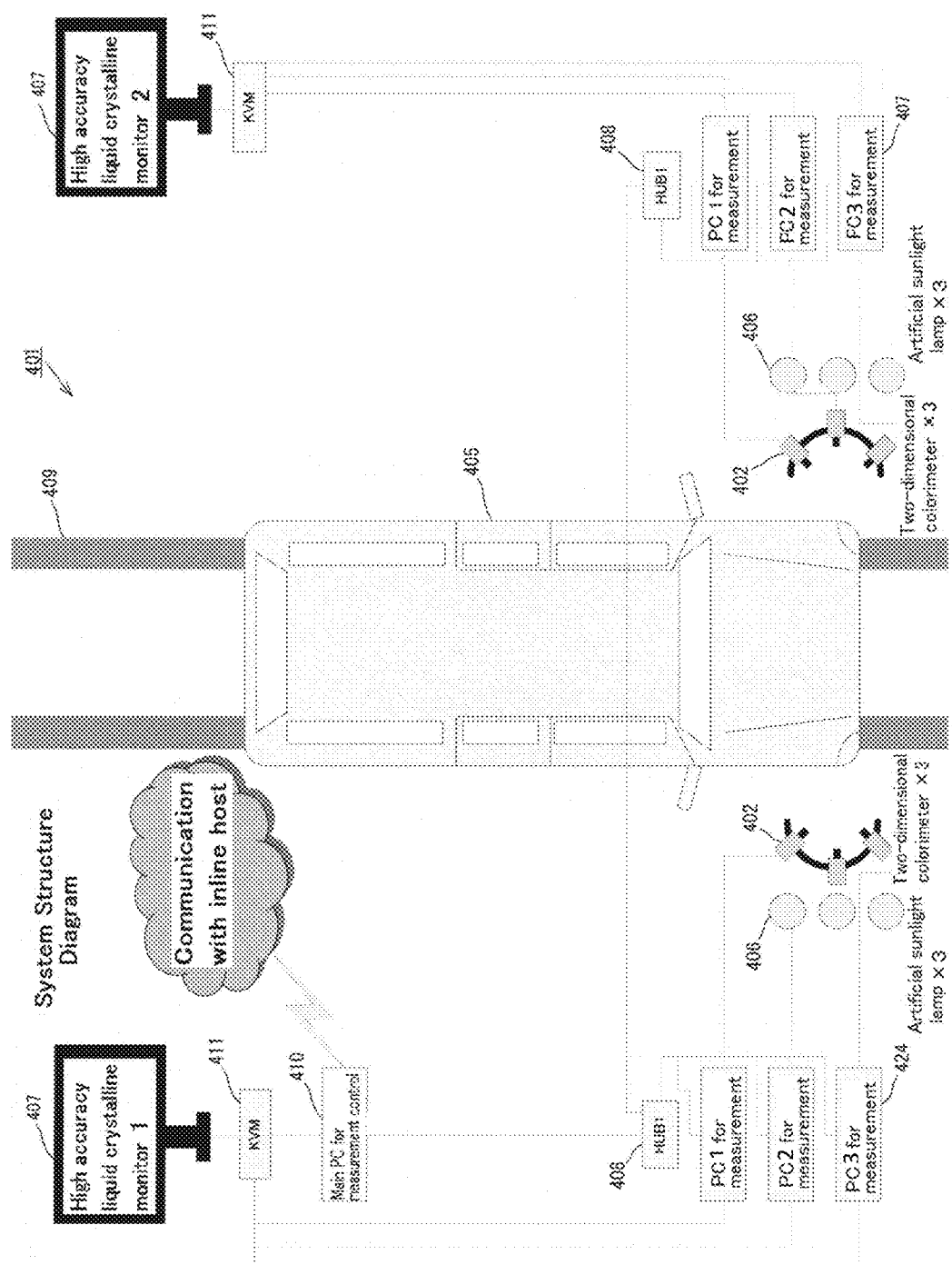
FIG. 27 is a block diagram illustrating the configuration of a coloring inspection apparatus 401 according to Embodiment 5 of the invention.

A coloring inspection apparatus 401 of Embodiment 5 is described below with reference to FIG. 27. Like components are expressed by like numerals in 400s and are not specifically described. The following mainly describes the differences. The coloring inspection apparatus 401 has a similar configuration to that of Embodiment 4 and includes a plurality of cameras 402 and a plurality of artificial sunlight lamps 406 placed in the vicinity of a production line 409. The cameras 402 and the artificial sunlight lamps 406 are connected with PC1 to PC3 for measurement 424 to send and receive signals to and from the PC1 to PC3 for measurement 424, and is also connected with a main PC for measurement control 410 via a hub 408. The PC1 to PC3 for measurement 424 are connected with a display unit 407 directly or via a KVM 411. The main PC for measurement control communicates with an inline host to send and receive data regarding, for example, the type of motor vehicle and the color. The cameras 402 may be replaced with a two-dimensional colorimeter. The color of each pixel in a specified inspection area is mapped in an xyz chromaticity diagram, like Embodiment 1. The spread and the density of mapping are provided as a histogram distribution. This allows for digitization of the metallic texture or the shiny texture such as lame or pearl pigment.

Figure 28:
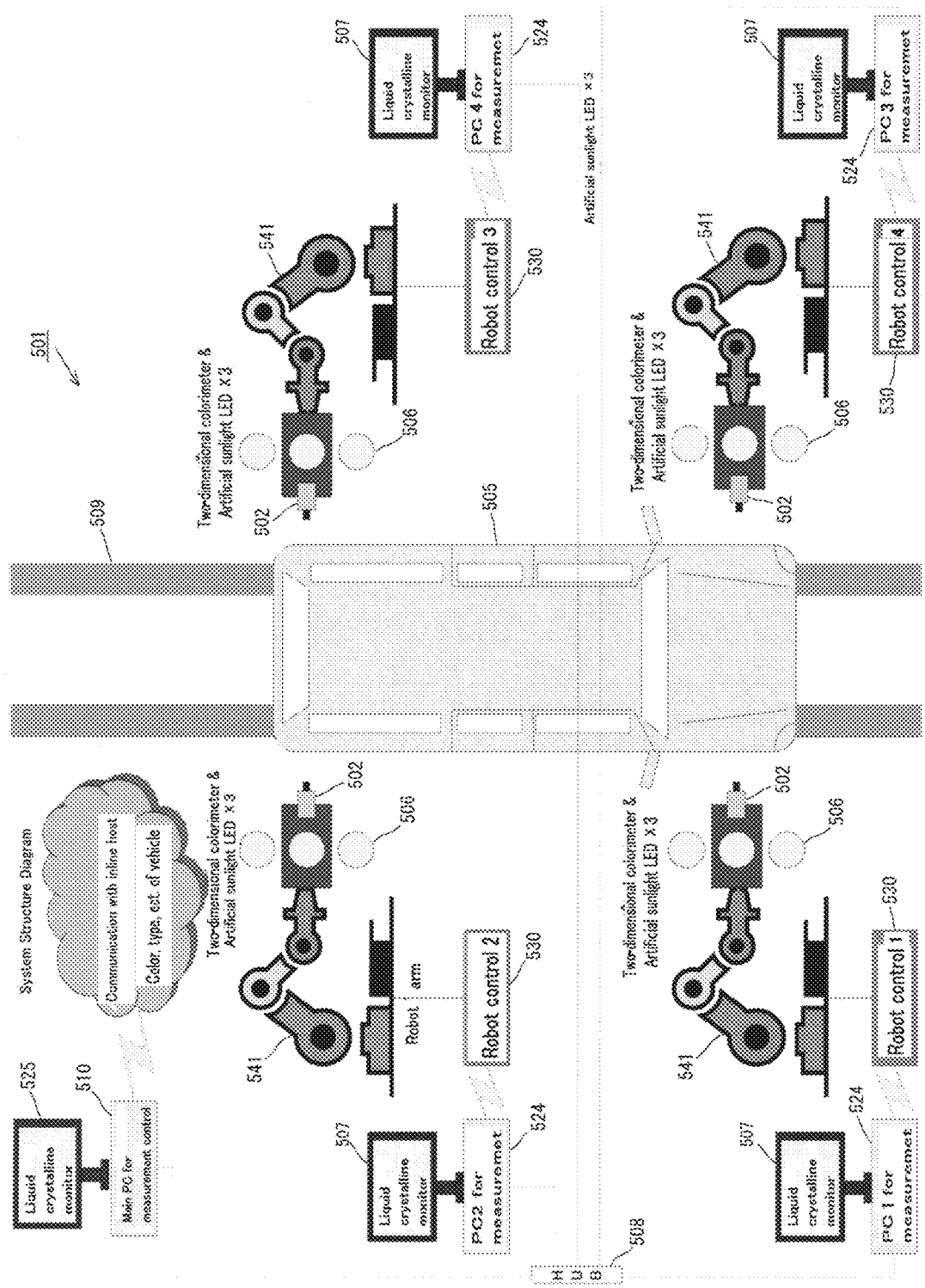
FIG. 28 is a block diagram illustrating the configuration of a coloring inspection apparatus 501 according to Embodiment 6 of the invention.

A coloring inspection apparatus 501 of Embodiment 6 is described below with reference to FIG. 28. Like components are expressed by like numerals in 500s and are not specifically described. The following mainly describes the differences. The coloring inspection apparatus 501 includes PC1 to PC4 for measurement 524. In the coloring inspection apparatus 501, cameras 502 are mounted to robot arms 541, such that the imaging angle is freely changeable. The robot arms 541 are controlled by robot controllers 1 to 4. APC for measurement 524 and a display unit 507 such as a liquid crystalline monitor are provided for each of the robot controllers 1 to 4 to send and receive data and display data. The PCs for measurement 524 are connected with a main PC for measurement control 510 via a hub 508 to send and receive data.

Figure 29A:
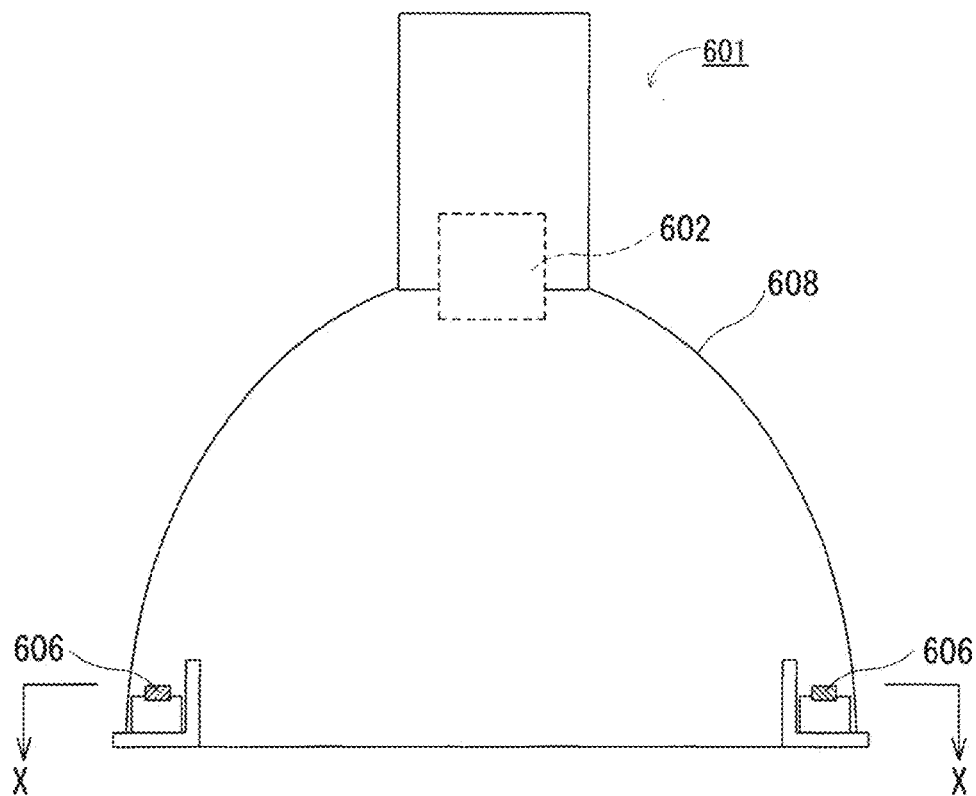
FIG. 29A is a vertical sectional view illustrating a coloring inspection apparatus 601 according to Embodiment 7 of the invention.
Figure 29B:
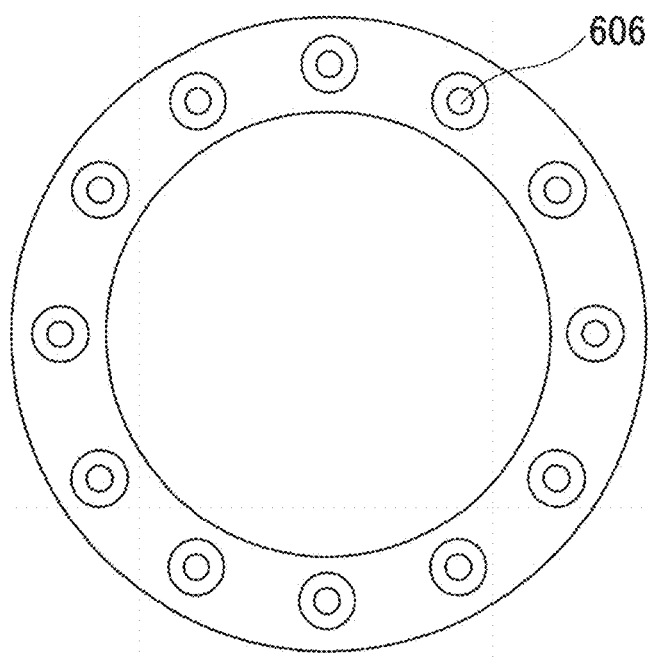
FIG. 29B is a cross sectional view taken on a line X-X.
Figures 30A, 30B:
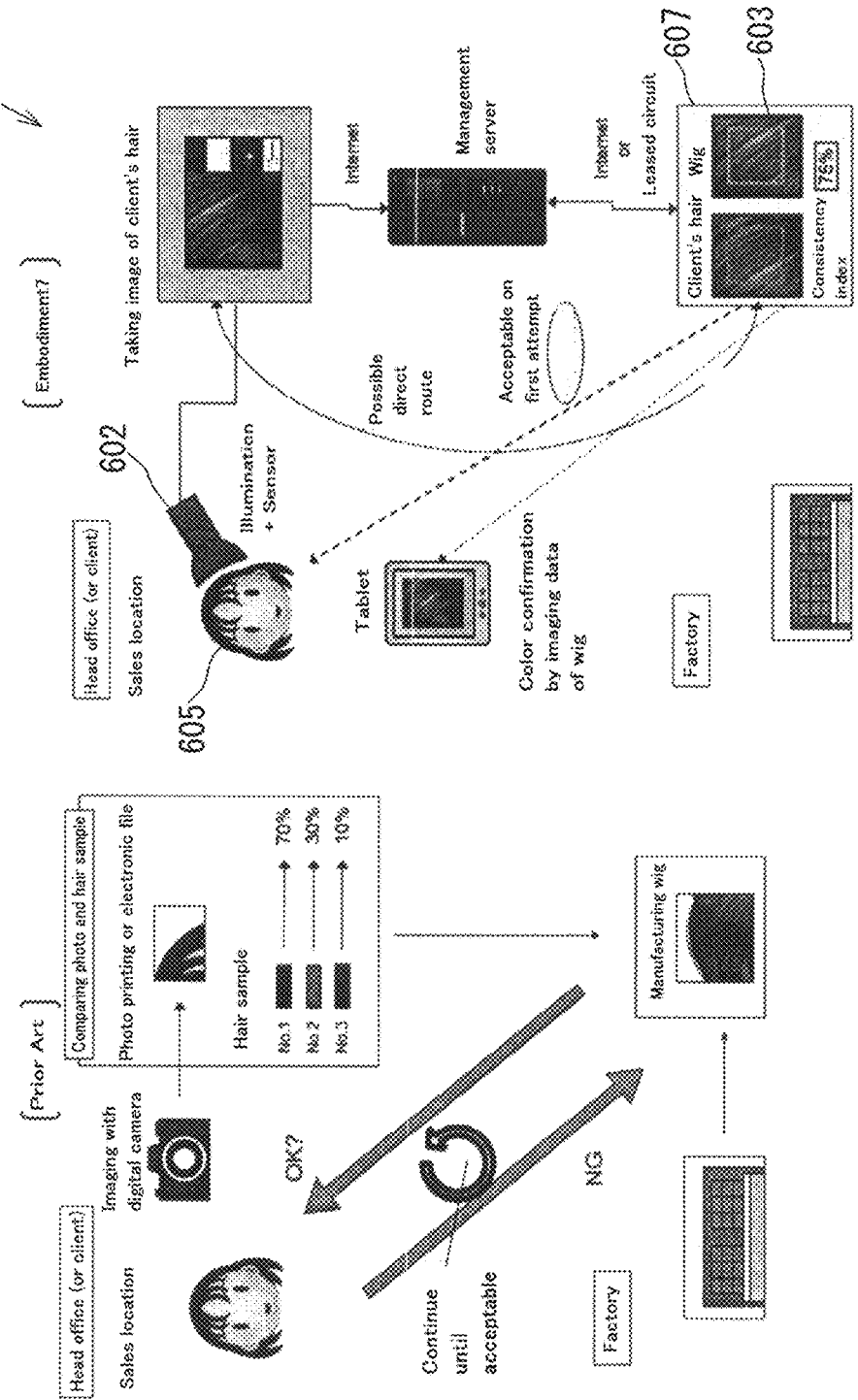
FIG. 30A is a diagram illustrating a conventional system.
FIG. 30B is a diagram illustrating an application of the coloring inspection apparatus 601 of Embodiment 7.

A coloring inspection apparatus 601 of Embodiment 7 is described below with reference to FIGS. 29 and 30. Like components are expressed by like numerals in 600s and are not specifically described. The following mainly describes the differences. The coloring inspection apparatus 601 includes a camera 602, an arithmetic processing unit 603, a display unit 607, LED lighting units 606, a dome-shaped cover 608 and a switch (not shown). The camera 602 is placed in an upper center portion of the dome-shaped cover 608. The camera 602 may be held with hand to image a measuring object placed below the camera 602. A plurality of the lighting units 606 are arranged in an arc shape to indirectly illuminate the upper inner wall surface. An LED light having the color rendering property of not lower than 92 is employed for the lighting unit 606. The lighting unit 606 is a high color rendering white light source for indirect illumination. The camera 602 has a measurement head assembly that allows for accurate measurement of color and the texture of a measuring object without the effect of outside light. The camera 602 employs the visual color reproducing camera system (colorimetry) and has the following capability with no shake. The camera 602 is used to take an image A of hair 605 of a client as a reference object R in a sales location or the like, and xyz chromaticity values or the like in an inspection area K are determined. The xyz chromaticity values or the like are sent from a personal computer to a manufacturing plant or the like by a communication line (and a management server as appropriate). The manufacturing plant or the like receives the data and manufactures a wig as an inspection object Q. The camera 602 is used to take an image B of the wig, and xyz chromaticity values are determined. The arithmetic processing unit 603 computes their color distribution histogram distributions and a color distribution consistency index. The display unit 607 displays the results of computation. When the wig is completed, the IT technology is applied to display inspection images and inspection data on a tablet and send and receive data between different locations, in order to allow the client to check the conditions of the completed wig. This configuration shows the client the images of the hair and the wig and the degree of color consistency, for the purpose of final check and comprehensive judgement including the texture of the wig. This prevents the potential troubles in mass production in the plant or the like as well as the potential troubles in custom-made. This accordingly saves the time, the cost and the energy.

Figure 31:
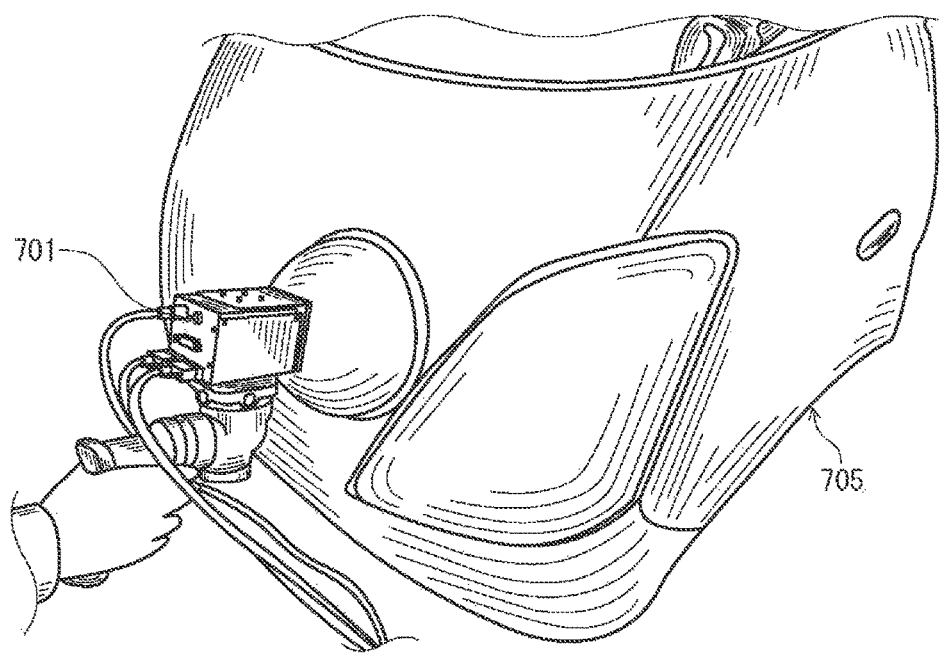
FIG. 31 is a perspective view illustrating a coloring inspection apparatus 701 in use according to Embodiment 8 of the invention.

A coloring inspection apparatus 701 of Embodiment 8 is described below with reference to FIG. 31. Like components are expressed by like numerals in 700s and are not specifically described. The following mainly describes the differences. The coloring inspection apparatus 701 is configured to inspect the coating of an automobile 705. Embodiment 8 differs from Embodiment 7 by that the inspection object is an automobile, but is otherwise similar to Embodiment 7.

The following describes other examples of applications. Two images, i.e., images A and B, of a reference object and an inspection object may be overlapped with each other, and their chromaticity histogram distributions may be displayed on the display unit 7. These chromaticity histogram distributions may be shown in an overlapping manner on one chromaticity diagram. The color distribution consistency index that indicates the degree of overlap may be shown by percentage. This enables a deviation of the chromaticity distribution of the inspection object from that of the reference object to be checked numerically. The result of inspection is shown numerically in each area K. The width of the grid G is adjustable. The threshold value of the index may be set arbitrarily. The measurement results and the obtained images may be stored. The aspects of the invention reduce the potential problem of individual difference which is inevitable in visual inspection and the potential trouble due to the difference from the clients' criterion of judgment and allow for color standardization and stable color management.

The aspects of the invention ensure non-contact imaging in a wide range. Imaging a measuring object from a plurality of different angles by flat lighting allows for digitization of the flip flop and ensures evaluation similar to the color and the texture felt by the human eye with regard to, for example, coating using aluminum flakes or pearl pigment. The aspects of the invention also allow for color matching of irregular pattern parts such as wood grain panels. The obtained images A and B may be displayed on the display unit 7 (overlay function). This facilitates positional alignment. The aspects of the invention allow for comparison between the inspection object and the reference object that are in different sizes or that are made of different materials. The aspects of the invention also allow for color matching of fabrics of irregular patterns or textures, such as leather. The aspects of the invention also allow for inspection of resin parts and inspection of color unevenness and color drift. The aspects of the invention allow for measurement and inspection of an object having concavities and convexities, for example, console box of the automobile. The aspects of the invention also allow for: (1) inspection of color drift between the bumper and the fender; (2) inspection of color drift between the fender and the front door; and (3) inspection of the color unevenness and flip flop of the front door with regard to the automobile. The aspects of the invention further allow for color matching of building materials having irregular patterns or textures such as flooring materials, as well as color matching of wall papers having irregular patterns or different textures of wood grain-like pattern, marble-like pattern and geometric pattern. The aspects of the invention further allow for inspection of texture of teeth in the dental field.

The aspects of the invention enable the color profiles, i.e., the color tint, the color unevenness and the texture to be validated graphically and numerically. The aspects of the invention also enable a shift of the chromaticity diagram to be checked in a specified inspection range and display graphs showing a variation in ΔE and Lab values. In the case of color inspection of different materials of, for example, the front door and the fender, the difference in color development between different materials may be validated and inspected by checking the color difference (ΔE) from the starting point to the terminal point.

The aspects of the invention allow for display of gains of respective parameters such as CMYK or Lab, as well as tristimulus values XYZ. The camera uses a camera filter that is equivalent to the color matching function and allows for detection of all color data in the color gamut recognizable by human eye. This ensures measurement of the high accuracy having the color difference ΔE of not higher than 1.0.

The embodiments described above have the following advantageous effects.

The aspects of the invention evaluate the textures which are conventionally difficult to be quantified, for example, the metallic texture and the shiny texture of lame and pearl pigment, and provide data indicating the integrated numbers of the respective grids included in the range of the inspection area K. This ensures clear and easy quantification of the textures such as metallic texture and rationalizes the comparison inspection between the inspection object and the reference object.

The aspects of the invention provide three inspection data with regard to the color of a measuring object: (1) sensory comparison by images: (2) objective and visually understandable comparison by chromaticity histogram distributions; and (3) comparison by quantified numerical values using the degree of consistency (%) of chromaticity histograms. These three data may be used together as a common language of color inside and outside of an organization and ensure smooth communication among sales, quality management and manufacturing divisions and clients. The color management of the invention solves the problems of the prior art, provides the objective color management criterion, quantifies the difference in texture or brightness, and departs from the conventional visual inspection and criteria samples-based inspection. The invention is characterized by not only digitization of accurate color data that is not achieved by the conventional system but accurate simulation of the actual color by an image. The aspects of the invention reduce the potential problem of individual difference which is inevitable in visual inspection and the potential trouble due to the difference from the clients' criterion of judgment.

Various data other than the above three data may be obtained from one image depending on the intended use. This is advantageous for troubleshooting. Storing images and data contributes to integration of color data and traceability. This is also usable for the material with regard to the history of products and the recovery material.

In the process of color research and development, for example, development of new color and experiments using new paints, new materials and new grounds, faithful image data may be stored together with quantified objective data. This contributes to integration of color data and traceability.

Using the communication technology such as the Internet or cloud enables products manufactured in plants in various parts of the world to be managed under the uniform criterion in the headquarters office. This saves the time and the cost of color management. This also allows the attendance inspection to be performed on a PC monitor of, for example, the headquarters or client.

The aspects of the invention allow for non-contact imaging of a measuring object with a camera. There is accordingly no fair that the product is damaged. The aspects of the invention provide an image converted to a color close to the real product in the situation that the real product is not actually observable and avoids a potential trouble caused by a gap when the real product is observed later. The aspects of the invention allow for measurement in a wide range on a chromaticity diagram and provide chromaticity distributions in a wide range, thus ensuring measurement of the complicated pattern and the texture as well as the color. The wide measurement range of color reduces the color drift between different measurement locations and provides uniform measurement conditions.

The invention is not limited to the above embodiments but various modifications may be made to the embodiments without departing from the scope of the invention. Such modifications as well as their equivalents are also included in the scope of the invention. The invention may be implemented by various aspects within the scope of the invention. The methods of obtaining image information according to three spectral sensitivities (S1(λ), S2(λ), S3(λ)) described in the above embodiments are only illustrative and are not restrictive. The technical feature of the invention is achieved by any other suitable method.

INDUSTRIAL APPLICABILITY

The coloring inspection apparatus of the invention has a wide range of industrial applicability, for example, for accurate color inspection in manufacturing fields of electric appliances, vehicles and housing materials. Examples of applications include inspection of color drift and color unevenness of printed matters, inspection of cosmetics including lame or pearl pigment, inspection of coating of automobiles (color drift and color unevenness, digitization of color drift between different materials, digitization of flip flop phenomenon by showing the degree of brightness graphically), wood grain inspection of the automobile, inspection of the leather sheet of the automobile (inspection of color unevenness and color drift of complicated texture material), color matching of flooring material, color matching of tiles (accurate imaging of the color and texture) and color matching inspection of cosmetics, sportswear, shoes and golf balls.

REFERENCE SIGNS LIST 1, 101, 201, 301, 401, 501, 601, 701 coloring inspection apparatus
2, 102, 202, 302, 402, 502, 602 camera
3, 103, 203, 303, 403, 503, 603 arithmetic processing unit
4 support assembly
5, 105, 205, 305, 405, 505, 705 automobile
6, 106, 206, 306, 406, 506, 606 lighting unit
605 human hair
608 dome-shaped cover
7, 107, 207, 307, 407, 507, 607 display unit
21 photographic lens
22a, 22b, 22c optical filter
23 imaging element
22a', 22c' dichroic mirror
23a, 23b, 23c imaging element
27 filter turret
40 head
41 arm
42 support column
43 base
42a reinforcing member
44 linear guide
45 arc-shaped member
46 lamp adjuster
47 camera angle adjuster
48a camera shifting adjustment motor
48b camera panning adjustment motor
49 head tilting adjuster
41a weight
41b height adjuster
106, 206 switch
103A, 103B, 103C, 203A, 203B, 203C operator
207 coloring device
309, 409, 509 automobile production line

The invention claimed is:

1. A color inspection apparatus, comprising:
A camera that is configured to have three spectral sensitivities (S1(λ), S2(λ), S3(λ)) linearly and equivalently converted to a CIE XYZ color matching function, all of the three spectral sensitivities (S1(λ), S2(λ), S3(λ)) being positive value;
an arithmetic processing unit that is configured to obtain and compute coloring data by conversion of an image which has three spectral sensitivities and which is obtained by the camera into tristimulus values X, Y and Z in a CIE XYZ color system;
a display unit; and
a lighting unit that is configured to illuminate a measuring object;
wherein
the arithmetic processing unit is connected to the camera;
the display unit is connected to the arithmetic processing unit; and
the arithmetic processing unit is configured to:
set a specified inspection area in the coloring data obtained by imaging the measuring object;
compute x and y values of the inspection area normalized from X, Y and Z values of each pixel in the inspection area with regard to an inspection object and a reference object as the measuring objects;
divide the inspection area by grids in xy coordinates of an xy chromaticity diagram and integrate numbers of pixels included in each grid with regard to the inspection object and the reference object to create respective xy chromaticity histogram distributions or divide the inspection area by grids in XYZ coordinates of an XYZ chromaticity diagram and integrate numbers of pixels in each grid with regard to the inspection object and the reference object to create respective XYZ chromaticity coordinate histogram distributions; and
inspect texture of color using a color distribution consistency index that represents a ratio of overlap of the two xy chromaticity coordinate histogram distributions of the inspection object and the reference object or that represents a ratio of overlap of the two XYZ chromaticity coordinate histogram distributions.

2. A color inspection apparatus, comprising:
a camera that is configured to have three spectral sensitivities (S1(λ), S2(λ), S3(λ)) linearly and equivalently converted to a CIE XYZ color matching function, all of the three spectral sensitivities (S1(λ), S2(λ), S3(λ)) being positive value;
an arithmetic processing unit that is configured to obtain and compute coloring data by conversion of an image which has three spectral sensitivities and which is obtained by the camera into tristimulus values X, Y and Z in a CIE XYZ color system;
a display unit; and
a lighting unit that is configured to illuminate a measuring object;
wherein
the arithmetic processing unit is connected to the camera;
the display unit is connected to the arithmetic processing unit; and
the arithmetic processing unit is configured to:
set a specified inspection area in the coloring data obtained by imaging the measuring object;
convert X, Y and Z values of each pixel included in the inspection area into LAB values with regard to an inspection object and a reference object as the measuring objects;
divide the inspection area by grids in Lab coordinates of an Lab chromaticity diagram and integrate numbers of pixels included in each grid with regard to the inspection object and the reference object to create respective Lab chromaticity coordinate histogram distributions; and inspect texture of color using a color distribution consistency index that represents a ratio of overlap of the two Lab chromaticity coordinate histogram distributions of the inspection object and the reference object.

3. The color inspection apparatus according to either claim 1 or claim 2, wherein the color distribution consistency index is computed by comparing the two pixel integrated numbers of the chromaticity histogram distributions in a grid unit to specify the smaller pixel integrated number, summing up the smaller pixel integrated numbers and computing a ratio of the summed-up pixel integrated numbers to a total number of pixels in the inspection area.

4. A color inspection method comprising:
obtaining an image which has three spectral sensitivities by a camera that is configured to have three spectral sensitivities ($S1(\lambda)$, $S2(\lambda)$, $S3(\lambda)$) linearly and equivalently converted to a CIE XYZ color matching function, all of the three spectral sensitivities ($S1(\lambda)$, $S2(\lambda)$, $S3(\lambda)$) being positive value;
using an arithmetic processing unit to:
generate coloring data by conversion of the image which has three spectral sensitivities into tristimulus values X, Y and Z in the CIE XYZ color system;
set a specified inspection area in the coloring data;
compute x and y values of the inspection area normalized from X, Y and Z values of each pixel in the inspection area with regard to an inspection object and a reference object as the measuring objects;
divide the inspection area by grids in xy coordinates of an xy chromaticity diagram and integrate numbers of pixels included in each grid with regard to the inspection object and the reference object to create respective xy chromaticity histogram distributions or divide the inspection area by grids in XYZ coordinates of an XYZ chromaticity diagram and integrate numbers of pixels in each grid with regard to the inspection object and the reference object to create respective XYZ chromaticity coordinate histogram distributions; and
inspect texture of color using a color distribution consistency index that represents a ratio of overlap of the two xy chromaticity coordinate histogram distributions of the inspection object and the reference object or that represents a ratio of overlap of the two XYZ chromaticity coordinate histogram distributions.

5. A color inspection method comprising:
obtaining an image which has three spectral sensitivities by a camera that is configured to have three spectral sensitivities ($S1(\lambda)$, $S2(\lambda)$, $S3(\lambda)$) linearly and equivalently converted to a CIE XYZ color matching function, all of the three spectral sensitivities ($S1(\lambda)$, $S2(\lambda)$, $S3(\lambda)$) being positive value;
using an arithmetic processing unit to:
generate coloring data by conversion of the image which has three spectral sensitivities into tristimulus values X, Y and Z in the CIE XYZ color system;
set a specified inspection area in the coloring data;
convert X, Y and Z values of each pixel included in the inspection area into LAB values with regard to an inspection object and a reference object as the measuring objects;
divide the inspection area by grids in Lab coordinates of an Lab chromaticity diagram and integrate numbers of pixels included in each grid with regard to the inspection object and the reference object to create respective Lab chromaticity coordinate histogram distributions; and
inspect texture of color using a color distribution consistency index that represents a ratio of overlap of the two Lab chromaticity coordinate histogram distributions of the inspection object and the reference object.

* * * * *